US012679201B1

(10) Patent No.: US 12,679,201 B1
(45) Date of Patent: Jul. 14, 2026

(12) United States Patent

Padmanabhan et al.

(54) POWER TAKE OFF SHIFTER ARRANGEMENT

(71) Applicant: Deere & Company, Moline, IL (US)

(72) Inventors: Pramod Padmanabhan, Pune (IN); Sandeep Chougule, Pune (IN); Roshan Sharma, Jaipur (IN); Mark J. Tieszen, Holland, IA (US); John J. Gallen, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 19/285,959

(22) Filed: Jul. 30, 2025

Related U.S. Application Data

(63) Continuation-in-part of application No. 19/059,746, filed on Feb. 21, 2025.

(51) Int. Cl.
| | |
|---|---|
| *B60K 17/28* | (2006.01) |
| *F16H 1/22* | (2006.01) |
| *F16H 57/02* | (2012.01) |
| *F16H 57/021* | (2012.01) |
| *F16H 57/023* | (2012.01) |

(52) U.S. Cl.
CPC .............. *B60K 17/28* (2013.01); *F16H 1/22* (2013.01); *F16H 57/021* (2013.01); *F16H 57/023* (2013.01); *F16H 2057/02056* (2013.01); *F16H 2057/0235* (2013.01)

(58) Field of Classification Search
CPC ......... B60K 17/28; F16H 1/22; F16H 57/021; F16H 57/023; F16H 2057/02056
See application file for complete search history.

(56) References Cited

U.S. PATENT DOCUMENTS

| | | | |
|---|---|---|---|
| 6,758,112 B2 * | 7/2004 | Ishii | ..................... F16H 57/0415 |
| | | | 60/485 |
| 7,047,839 B2 | 5/2006 | Ishii et al. | |
| 11,349,331 B2 * | 5/2022 | Stoltz | .................... H02J 7/1492 |

(Continued)

FOREIGN PATENT DOCUMENTS

| | | |
|---|---|---|
| JP | H0662611 A | 3/1994 |
| KR | 20180085170 A | 7/2018 |

OTHER PUBLICATIONS

Utility U.S. Appl. No. 19/059,746, filed Feb. 21, 2025.

*Primary Examiner* — Jason D Shanske
*Assistant Examiner* — Tiffany L Webb
(74) *Attorney, Agent, or Firm* — KLINTWORTH & ROZENBLAT LLP

(57) ABSTRACT

A power take-off assembly includes a first gear, a second gear, a first PTO arrangement having an output gear, a second PTO arrangement having a countershaft gear, a coupler sleeve having internal splines in engagement with a first annular hub of the first gear, and a PTO shifter arrangement having a shifting ring with internal output splines spaced from internal input splines. The internal input splines in sliding engagement with external splines of the coupler sleeve. The shifting ring being translatable between a first position, a second position, and a third position where the internal output splines are engaged with and transfer rotational power to: the output gear only when the shifting ring is in the first position, the output gear and the second gear when the shifting ring is in the second position, and the second gear only when the shifting ring is in the third position.

20 Claims, 21 Drawing Sheets

(56)  References Cited

U.S. PATENT DOCUMENTS

| | | | | |
|---|---|---|---|---|
| 11,945,312 | B2 * | 4/2024 | Golder | .................... F16D 21/00 |
| 12,054,042 | B2 | 8/2024 | Abbott | |
| 12,365,241 | B1 * | 7/2025 | Patil | ....................... B60K 25/06 |
| 12,370,875 | B2 | 7/2025 | Okazaki et al. | |
| 2017/0307129 | A1 | 10/2017 | Rinkenbaugh et al. | |
| 2025/0289304 | A1 * | 9/2025 | Natarajan | .............. B60K 17/28 |

* cited by examiner

POWER TAKE OFF SHIFTER ARRANGEMENT

CROSS-REFERENCE TO RELATED APPLICATION(S)

This application is a continuation-in-part of U.S. patent application Ser. No. 19/059,746, filed Feb. 21, 2025, which is incorporated by reference herein in its entirety.

STATEMENT OF FEDERALLY SPONSORED RESEARCH OR DEVELOPMENT

Not applicable.

FIELD OF THE DISCLOSURE

This disclosure generally relates to work vehicles and power take-offs (PTOs) thereof.

BACKGROUND OF THE DISCLOSURE

There are a variety of available implements that may be attached to work vehicles to perform various tasks or operations. These implements may attach at different locations on the work vehicle and have specific requirements for the work vehicle. For example, some of these implements may require a mid-mount PTO with a specific operating RPM at the PTO for the implement to perform properly.

SUMMARY OF THE DISCLOSURE

In one implementation, a power take-off (PTO) assembly for a transmission of a work vehicle is disclosed. The PTO assembly may include a first gear and a second gear spaced apart about a rotation axis. The first gear may have a first annular hub with external splines extending about the rotation axis and the second gear may have a second annular hub with external splines extending about the rotation axis. The PTO assembly may further include a first PTO arrangement having an output gear driving an output shaft to rotate about the rotation axis, a second PTO arrangement having a countershaft gear driven by the second gear to rotate a countershaft arranged in parallel with the output shaft, and a coupler sleeve having internal splines and external splines and disposed about the rotation axis between the first gear and the second gear. The internal splines of the coupler sleeve may be in engagement with the external splines of the first annular hub of the first gear. The PTO assembly may further include a PTO shifter arrangement having a shifting ring disposed about the rotation axis with internal input splines in sliding engagement with the external splines of the coupler sleeve and with internal output splines spaced apart from the internal input splines along the rotation axis by a gap. The shifting ring may be translatable along the rotation axis between a first position, a second position, and a third position such that the internal output splines are engaged with and transfer rotational power to: the output gear only when the shifting ring is in the first position, the output gear and the second gear when the shifting ring is in the second position, and the second gear only when the shifting ring is in the third position.

In an example of the PTO assembly, the first annular hub may extend a distance axially along the rotation axis from the first gear to proximate the output gear and the second annular hub may be proximate the output gear opposite the first annular hub. In a further example of the PTO assembly, the coupler sleeve may extend the distance axially along the rotation axis and is positioned coaxially with the first annular hub along the rotation axis, and the external splines of the coupler sleeve may extend the distance axially along the rotation axis.

In a further example of the PTO assembly, the internal input splines of the shifting ring may engage the external splines of the coupler sleeve at a different axial position along the rotation axis for each position of the shifting ring. In a further example of the PTO assembly, in the third position, the shifting ring may be positioned axially along the rotation axis to position the output gear in the gap disengaging the internal output splines from the output gear.

In a further example of the PTO assembly, the internal input splines may include first splines and second splines spaced apart axially along the rotation axis from the first splines by a second gap. In a further example of the PTO assembly, each external spline of the coupler sleeve may include a locking feature positioned on and extending away from both flanks. In the first position, the locking feature may be positioned within the gap; in the second position, the locking feature may be positioned within the second gap; and in the third position, the locking feature may be positioned outside of the shifting ring. In a further example of the PTO assembly, the locking features may be configured to allow the first splines and second splines to slide axially past the locking features when the shifting ring is not rotating about the rotation axis and the locking features may be configured to prevent the first splines and second splines from sliding axially past the locking features when the shifting ring is rotating about the rotation axis.

In a further example of the PTO assembly, the first gear, the second gear, and the shifting ring may each be position coaxially with the first PTO arrangement. In a further example of the PTO assembly, a housing of the transmission may define a rear access opening to provide access to the first PTO arrangement, the second PTO arrangement, the first gear, the second gear, the coupler sleeve, and the PTO shifter arrangement.

In one implementation, a transmission of a work vehicle is disclosed. The transmission may include a housing defining a rear access opening and a rear cover positioned over the rear access opening and a PTO assembly positioned within the housing. The PTO assembly may include a first gear and a second gear spaced apart about a rotation axis, the first gear may have a first annular hub with external splines extending about the rotation axis and the second gear may have a second annular hub with external splines extending about the rotation axis. The PTO assembly may further include a rear PTO arrangement having an output gear driving an output shaft to rotate about the rotation axis, wherein the output shaft extends through the rear cover. The PTO assembly may further include a middle PTO arrangement having a countershaft gear driven by the second gear to rotate a countershaft arranged in parallel with the output shaft, the countershaft extending along the housing away from the rear PTO arrangement. The PTO assembly may further include a coupler sleeve having internal splines and external splines and disposed about the rotation axis between the first gear and the second gear. The internal splines of the coupler sleeve may be in engagement with the external splines of the first annular hub of the first gear. The PTO assembly may further include a PTO shifter arrangement having a shifting ring disposed about the rotation axis with internal input splines in sliding engagement with the external splines of the coupler sleeve and with internal output splines spaced apart from the internal input splines along the rotation axis by a gap. The shifting ring may be translatable along the rotation axis between a first position, a second position, and a third position such that the internal output splines are engaged with and transfer rotational power to: the output gear only when the shifting ring is in the first position, the output gear and the second gear when the shifting ring is in the second position, and the second gear only when the shifting ring is in the third position.

In an example of the transmission, the first annular hub may extend a distance axially along the rotation axis from the first gear to proximate the output gear and the second annular hub is proximate the output gear opposite the first annular hub. In a further example of the transmission, the coupler sleeve may extend the distance axially along the rotation axis and is positioned coaxially with the first annular hub along the rotation axis, and the external splines of the coupler sleeve may extend the distance axially along the rotation axis. In a further example of the transmission, the internal input splines of the shifting ring may engage the external splines of the coupler sleeve at a different axial position along the rotation axis for each position of the shifting ring.

In a further example of the transmission, in the third position the shifting ring may be positioned axially along the rotation axis to position the output gear in the gap disengaging the internal output splines from the output gear. In a further example of the transmission, the internal input splines may include first splines and second splines spaced apart axially along the rotation axis from the first splines by a second gap. In a further example of the transmission, each external spline of the coupler sleeve may include a locking feature positioned on and extending away from both flanks. In the first position, the locking feature may be positioned within the gap; in the second position, the locking feature may be positioned within the second gap; and in the third position, the locking feature may be positioned outside of the shifting ring. In a further example of the transmission, the locking features may be configured to allow the first splines and second splines to slide axially past the locking features when the shifting ring is not rotating about the rotation axis, and the locking features may be configured to prevent the first splines and second splines from sliding axially past the locking features when the shifting ring is rotating about the rotation axis.

In a further example of the transmission, the first gear, second gear, and the shifting ring may be each position coaxially with the rear PTO arrangement. In a further example of the transmission, the rear access opening may provide access to the rear PTO arrangement, the middle PTO arrangement, the first gear, the second gear, the coupler sleeve, and the PTO shifter arrangement.

Figure 1:
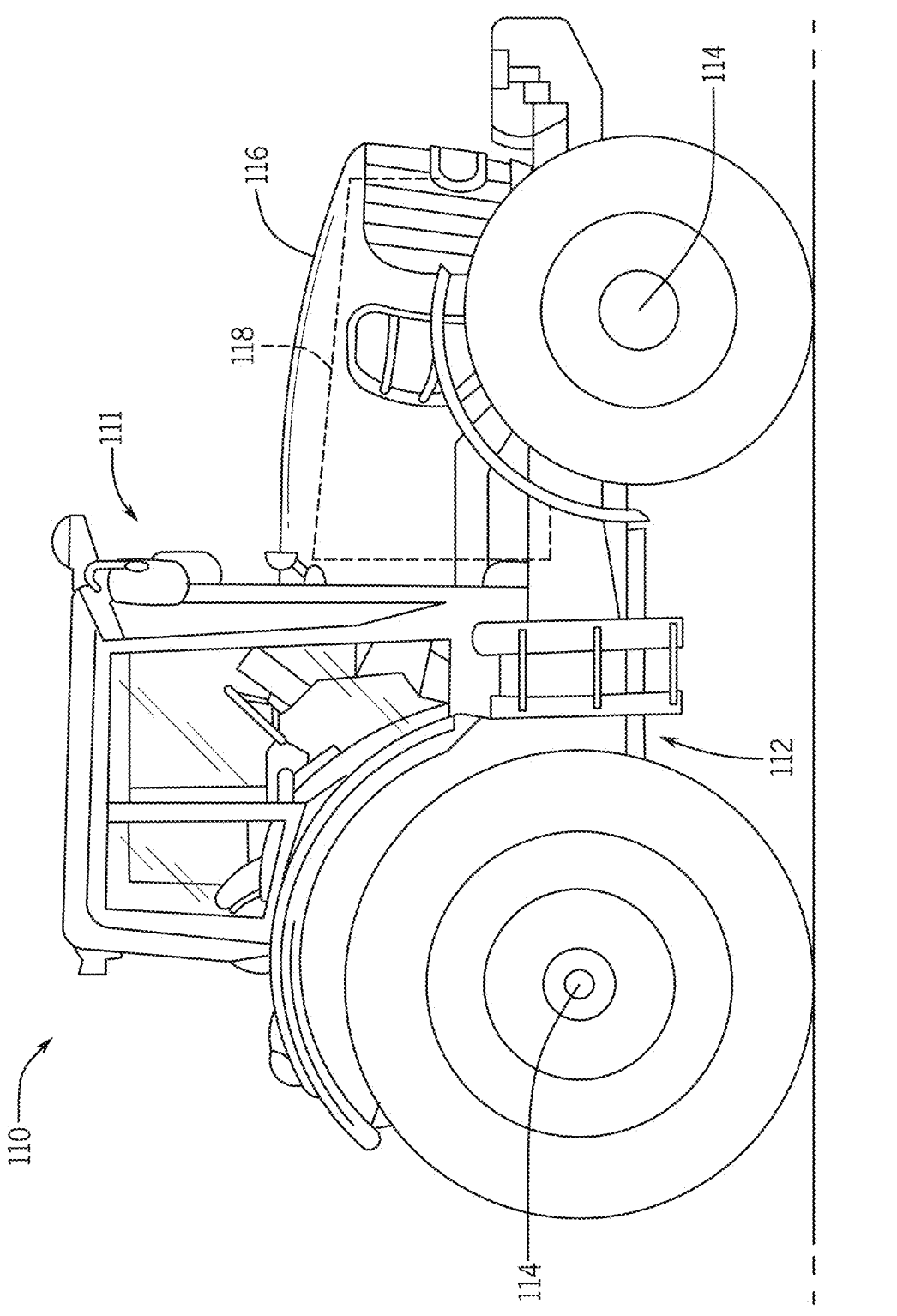
FIG. 1 is a side view of an example work vehicle incorporating at least one aspect of the present disclosure.

Throughout the drawings, identical reference numbers designate the same element. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Example embodiments of the present disclosure are shown in the accompanying figures of the drawings described briefly above. Various modifications to the example embodiments may be contemplated by one of skill in the art without departing from the scope of the present invention, as set forth in the appended claims.

Overview

There are a variety of available implements that may be attached to work vehicles to allow the work vehicle to perform various tasks or operations. These implements may attach at different locations on the work vehicle and have specific requirements for the work vehicle. For example, a work vehicle may be an agricultural tractor with attachable work implements powered by rear-, front-, and/or mid-mount PTOs. Example implements include various rear-towed implements, such as rakes, seeders, balers, and the like, mid-mounted implements such as mowers, and front-mounted implements, such as plows and blowers, among others. The different implements may require a specific rotation direction, speed, and/or torque for operation. Additionally, some front-mount implements may be driven by a mid-mount PTO, and some work vehicles have the mid-mount PTO in different locations such as at the middle-side or the middle-bottom of the work vehicle. The different implement requirements and middle PTO locations on a work vehicle may lead to only some implements being able to be attached to specific work vehicles. As such, there is a need to be able to adjust the mid-mount PTO on a work vehicle so that work vehicles may be capable of driving a larger variety of implements.

The present disclosure provides an auxiliary removable middle PTO arrangement that may be attached to a work vehicle in a modular manner providing alternative mid-mount PTO configurations. When attached, the auxiliary removable middle PTO arrangement may become part of the PTO assembly of the work vehicle and be driven along with the PTO assembly. The auxiliary removable middle PTO arrangement may include a housing and a gear train that extends into the work vehicle to mechanically couple with the PTO assembly in the work vehicle. There may be different auxiliary removable middle PTO arrangements with different gear trains that provide different rotation directions or speeds at the mid-mount PTO shaft. There may also be different auxiliary removable middle PTO arrangements for mounting at different middle locations on the work vehicle. For example, one configuration may mount at the side of the work vehicle and another may mount at the bottom of the work vehicle. As such, the work vehicle may accommodate mounting multiple auxiliary removable middle PTO arrangements at one or both locations.

Having different auxiliary removable middle PTO arrangements that are attachable allows an operator to attach the specific one needed for a specific implement. This configurability may broaden the amount of implements that may be attached to the work vehicle. For example, the operator may attach a specific auxiliary removable middle PTO arrangement to the bottom of the work vehicle to attach an implement requiring one speed (e.g., 1,000 RPM) at a bottom mid-mount PTO. The operator may later replace it with another auxiliary removable middle PTO arrangement for an implement requiring another speed (e.g., 2000 RPM). The work vehicle may also have a side mounting auxiliary removable middle PTO arrangement that may be utilized instead or in addition to the bottom mid-mount PTO to provide output power, at the necessary direction, speed, and torque, to another implement of the same or different type.

The power parameters of the output PTO shaft of an auxiliary removable middle PTO arrangement may be based, in part, on the gear train in the auxiliary removable middle PTO arrangement. The housing of the auxiliary removable middle PTO arrangement supports the gear train and the gear train drives the output PTO shaft. The gear train may be designed to produce a specific rotation direction and operational speed and torque at the output PTO shaft according to the arrangement, quantity, and tooth-count of the gears in the gear train.

In various embodiments, the PTO assembly includes an output gear that meshes with and drives any attached auxiliary removable middle PTO arrangement. There may be more than one auxiliary removable middle PTO arrangement attached to the work vehicle at one time, as noted, in which case, each attached auxiliary removable middle PTO arrangement may be driven by the same output gear of the PTO assembly. For example, each auxiliary removable middle PTO arrangement may extend into the driveline of the work vehicle and an input gear of the gear train meshes with the output gear of the PTO assembly.

The auxiliary removable middle PTO arrangements may have different designs based on the mounting location of the auxiliary removable middle PTO arrangement. For example, the mounting location may determine how the gear train extends into the driveline so that the input gear of the gear train meshes with the output gear. For example, the different auxiliary removable middle PTO arrangements may be designed such that there is room to allow multiple input gears to mesh with the same output gear. For example, a side mounted auxiliary removable middle PTO arrangement may extend directly toward the output gear and a bottom mounted auxiliary removable middle PTO arrangement may extend at an angle. The angle may allow the input gear of the bottom mounted auxiliary removable middle PTO arrangement to mesh with the output gear at a location farther away from the input gear of the side mounted auxiliary removable middle PTO arrangement. This allows more room between the side middle PTO arrangement input gear and the bottom middle PTO arrangement input gear.

Many work vehicles include a rear PTO arrangement that may be used to drive an attached implement in which case the auxiliary removable middle PTO arrangement may be driven by the same input as the rear PTO arrangement. Both the auxiliary removable middle PTO arrangement and rear PTO arrangement may be mechanically coupled to a PTO shifter arrangement. In some embodiments, the PTO shifter arrangement is movable to three positions: the first position driving only the rear PTO arrangement, the second position driving both the rear PTO arrangement and any attached auxiliary removable middle PTO arrangement, and the third position driving only the attached auxiliary removable middle PTO arrangement. A manual operator handle may be coupled to the PTO shifter arrangement to effect the three positions and engage the PTOs desired.

The PTO shifter arrangement may have three positions and may be placed within the axial space of a two position PTO shifter arrangement. Stated another way, the three position PTO shifter arrangement may take up the axial space of a two position PTO shifter arrangement. For example, the three position PTO shifter arrangement may be purchasable to be positioned in a work vehicle with a two PTO shifter arrangement. The two position PTO shifter arrangement may allow a rear PTO to be engaged in 2 different PTO Speeds (540 or 540E). The three position PTO Shifter arrangement will provide engagement where only rear PTO, only mid PTO, or both are engaged. Having the three positions over the two positions may be desirable for some implements or configurations of the work vehicle.

The PTO shifter arrangement may be part of the PTO assembly. The PTO assembly may include a first gear, a coupler sleeve, the PTO shifter arrangement, a rear PTO arrangement, a second gear, and a mid PTO arrangement. The first gear may be configured to receive rotational power from the engine when the PTO assembly is engaged. The first gear may include an annular hub extending away from the first gear. The annular hub may include external splines. The coupler sleeve may be positioned around the annular hub and positioned against the base of the first gear. The coupler sleeve may include internal splines that engage with the external splines of the annular hub and external splines that run the length of the coupler sleeve. The PTO shifter arrangement may include a shifting ring that has internal input splines spaced apart from internal output splines by a gap. The internal input splines may be in sliding engagement with the external splines of the coupler sleeve. The shifting ring being translatable along the rotation axis between a first position, a second position, and a third position such that the internal output splines are engaged with and transfer rotational power to: an output gear of the rear PTO arrangement only when the shifting ring is in the first position, the output gear of the rear PTO arrangement and the second gear when the shifting ring is in the second position, and the second gear only when the shifting ring is in the third position. The second gear may be configured to drive the mid PTO arrangement.

The PTO assembly may be designed to reduce the axial space required so that the PTO shifter arrangement may have three positions and still fit within the axial space of a two position PTO shifter arrangement. The shifting ring needs to move an axial length to move between the three positions. As such, this axial length needs to fit within the axial length of the two position PTO shifter arrangement. To gain some usable axial length the coupler sleeve is used. The coupler sleeve allows there to be external splines closer to the base of the first gear than is possible for external splines on an annular hub of the first gear. This is a manufacturing constraint of a spline cutting machine that is cutting the external splines on an annular hub of a gear to require some space from the end of the splines to the base of the gear so that the spline cutting machine does not cut into the base of the gear. The coupler sleeve may have splines cut that run the entire axial length of the coupler sleeve. Positioning the coupler sleeve over the annular hub allows there to be splines that run the entire axial length of the annular hub including against the base of the gear. The internal input splines may engage with the external splines on the coupler sleeve. As such, the coupler sleeve may provide more axial distance that the shifting ring may move with the internal input splines remaining engaged than if there was no coupler sleeve and the shifting ring was directly engaged with an annular hub of the gear.

The coupler sleeve may include a locking feature configured to prevent the shifting ring from moving axially to a different position when the shifting ring is rotating with the coupler sleeve. The locking feature may be positioned on both flanks (i.e., side) of each spline. For example, the locking feature may be a protrusion extending away from each flank of every spline. In at least one aspect, the locking feature may be formed through swedging the coupler sleeve to form the protrusions on each spline. For example, the splines of the coupler sleeve may be compressed everywhere except the location of the locking feature to form a protrusion at that location. In at least one aspect, the locking feature is not at the top (i.e., crest) of each spline. As such, there is not a protrusion extending away from the top of the splines. Since the locking feature may be formed through swedging, it may not be possible to form the locking feature on an annular hub of a gear since access to both sides of the locking feature may be required.

The internal input splines of the shifting ring may include two sets of internal splines separated by a second gap. In the first position, the locking feature may be positioned to the right of both internal input splines between the two sets of internal input splines and the internal output splines. In the second position, the locking feature may be positioned within the second gap between the two internal input splines. In the third position, the locking feature may be positioned to the left of both internal input splines and outside of the shifting ring. When the shifting ring and the coupler sleeve are not rotating, then the two sets of internal input splines may slide past the locking feature to position the shifting ring in first, second, or third position. When the coupler sleeve and shifting ring are rotating together, the internal input splines are engaged and pressing against the external splines of the coupler sleeve and sliding the shifting ring to change its position would have the internal input splines hit the locking feature preventing the shifting ring from changing position while it is rotating. For example, the torque being transferred between the coupler sleeve and shifting ring during rotation may apply a force between them that prevents the internal input splines from sliding past the locking feature. The locking feature may protrude small enough to allow the internal input splines to slide past the locking feature when the shifting ring is not rotating and still contact the shifting ring if the shifting ring is moved axially when the shifting ring is rotating. In at least one aspect, the protrusions on the flanks of the splines at the location of the locking feature may make the spline 0.2 mm thicker at the locking feature than the rest of the spline.

In some embodiments, the work vehicle includes a rear cover that when removed allows operator access to the gearing that drives the auxiliary removable middle PTO arrangement and the PTO shifter arrangement. This allows ready access to install the appropriate gearing or repair any damage to keep the work vehicle maintained and able to drive auxiliary removable middle PTO arrangements. For example, access is easier since the work vehicle does not need any housings to be disassembled and only a cover needs to be removed. In some aspects, the rear cover may be removed to change the PTO assembly from a two position PTO arrangement to a three position PTO arrangement.

The different auxiliary removable middle PTO arrangements allow the work vehicle to be configurable to operate the desired implements. In a first configuration, the operator may not have any auxiliary removable middle PTO arrangements attached and may only use the rear PTO arrangement. In a second configuration, the operator may have only a side mounted auxiliary removable middle PTO arrangement attached. In a third configuration, the operator may have only a bottom mounted auxiliary removable middle PTO arrangement attached. In a fourth configuration, the operator may have both a bottom and a side mounted auxiliary removable middle PTO arrangement attached. Different auxiliary removable middle PTO arrangements may have different output shaft directions and/or speeds and torques, which when taken into account provides a variety of different configurations. Additionally, the auxiliary removable middle PTO arrangements may have different output shafts for coupling to specific implements even further providing more options.

An example embodiment of a work vehicle with a three-position power take off shifter arrangement is provided in FIGS. 1-9 and auxiliary removable middle PTO arrangements attachable to the work vehicle are provided in FIGS. 10A-12B according to the present disclosure. The following description should be understood as merely providing a non-limiting example context in which embodiments of the present disclosure may be better understood.

Example Work Vehicle with Interchangeable
Middle Mount Power Take Offs

Referring to FIG. 1, a work vehicle 110 is shown that can implement embodiments of the disclosure. In the illustrated example, the work vehicle 110 is depicted as an agricultural tractor. It will be understood, however, that other configurations may be possible, including configurations with the work vehicle 110 as a different kind of tractor, a harvester, a log skidder, a grader, or one of various other work vehicle platforms. The work vehicle 110 includes a chassis or chassis 112 carried on front and rear wheels (or tracks) 114. An operator cabin 111 is carried on the chassis 112. The operator cabin 111 including various operator interfaces allowing an operator to provide inputs to control the work vehicle 110. Positioned on a forward end region of the chassis 112 is an engine housing 116 within which is located an engine system 118. The engine system 118 may include an internal combustion engine or an electric machine. The engine system 118 provides power via an associated powertrain to an output member (e.g., an output shaft, not shown) that, in turn, transmits power to axle(s) of the work vehicle 110 to provide propulsion thereto and/or to a power take-off shaft for powering an implement on or associated with the work vehicle 110, for example.

Figure 2:
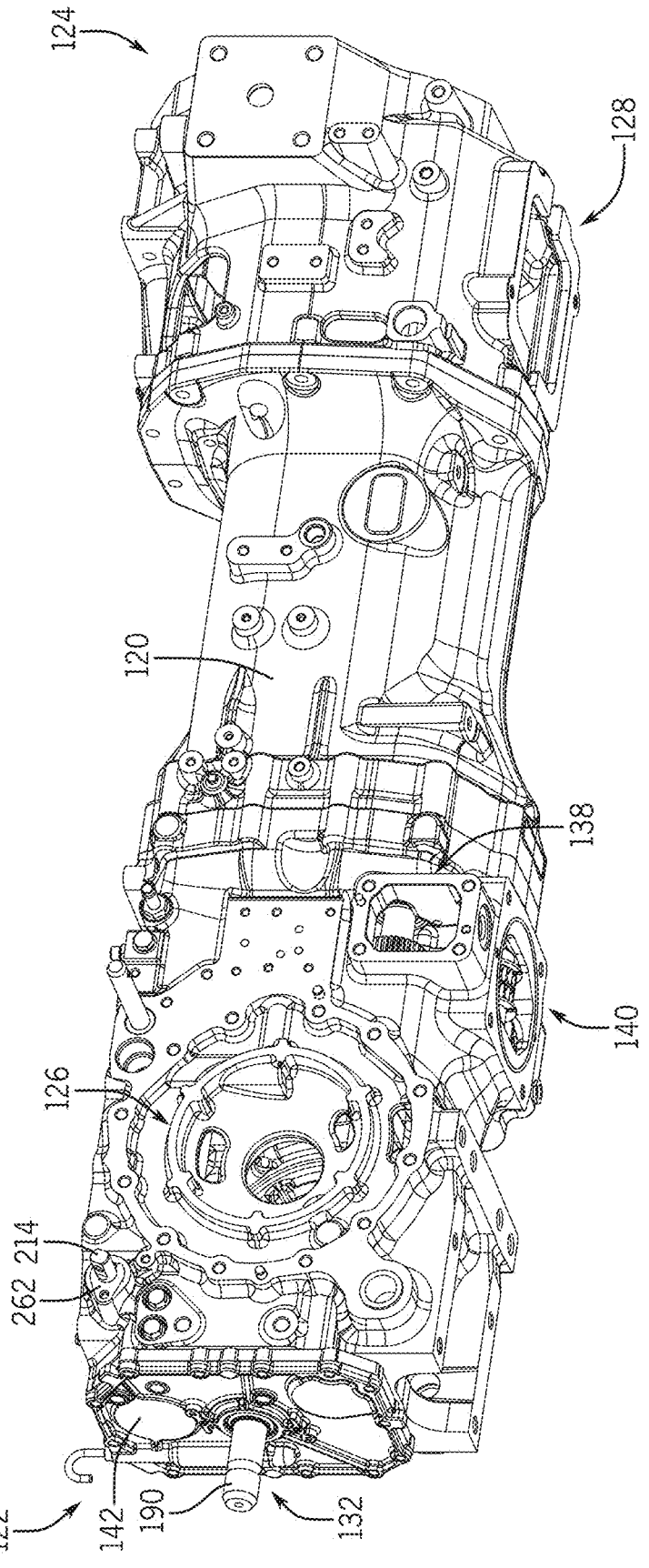
FIG. 2 is a perspective view of a driveline component thereof.

Referring to FIG. 2, the driveline component 120 houses a transmission including a powertrain of the work vehicle 110 and the driveline component 120 extends along the work vehicle 110. In at least one aspect, the driveline component 120 is the chassis 112 of the work vehicle 110. In an alternative aspect, the driveline component 120 is attached to the frame 112 of the work vehicle 110. The driveline component 120 includes a rear end 122 and a forward end 124. An axle for a rear wheel 114 may be attached to the driveline component 120 at the rear end 122. For example, the axle (not shown) may be attached at the axle opening 126. Another axle may be attached on the opposite side of the driveline component 120 at the axle opening 126 on that side. The axles may receive power from a powertrain inside of the driveline component 120 to drive the rear wheels 114. The axle for the front wheels may be attached at the forward end 124. In one aspect, the driveline component 120 may sit on a front axle at the opening 128.

Figure 3:
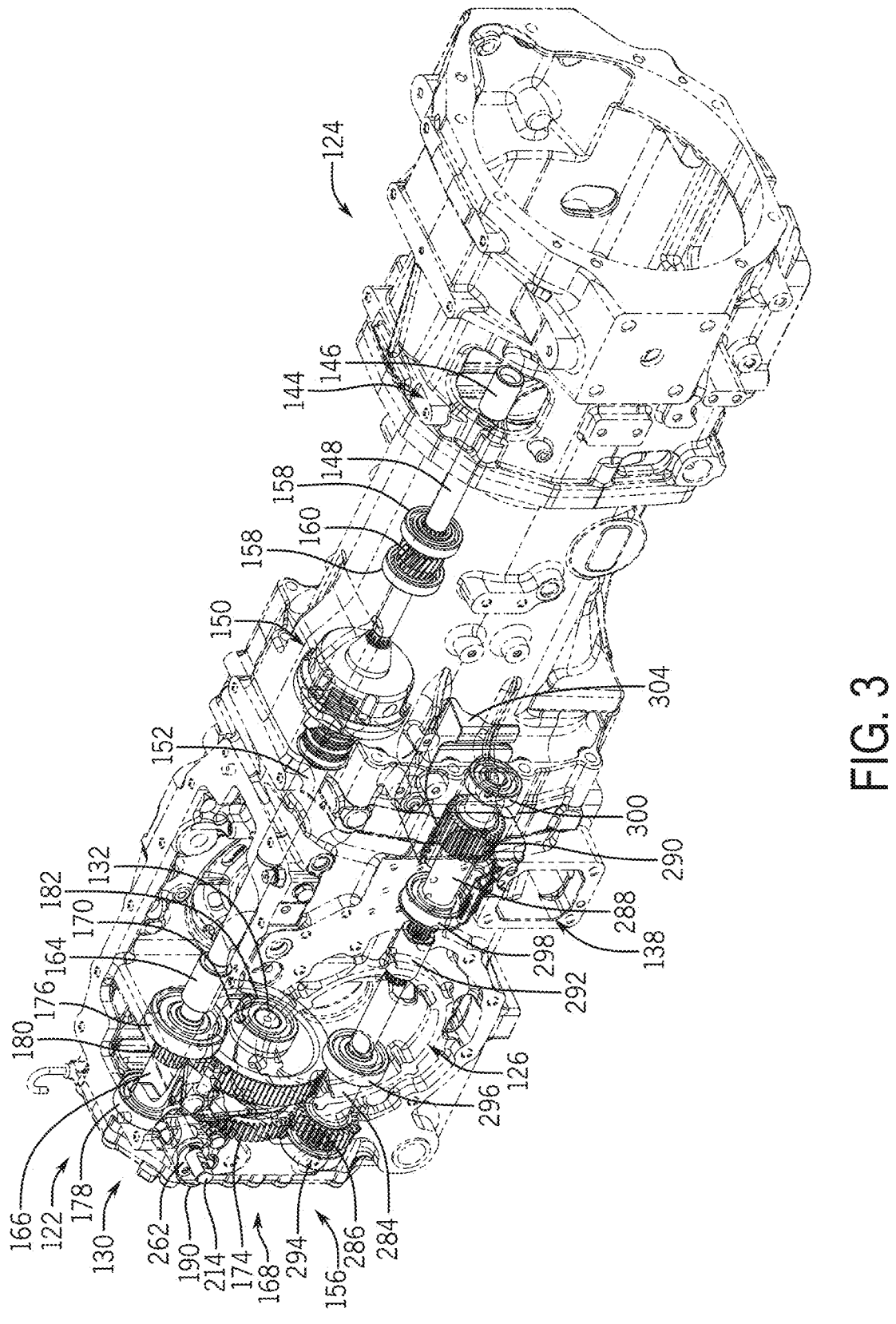
FIG. 3 is a perspective view of a PTO assembly thereof.

Referring also to FIG. 3, the driveline component 120 also houses a power take-off (PTO) assembly 130 of the transmission. The PTO assembly 130 receives rotational power from the engine system 118 and drives a rear PTO arrangement 132 and auxiliary removable middle PTO arrangements 134 (FIGS. 10A-10C), 136 (FIGS. 11A-11C). The side auxiliary removable middle PTO arrangement 136 may be attached at a side access opening 138 in the driveline component 120 and the bottom auxiliary removable middle PTO arrangement 134 may be attached at a bottom access opening 140 in the driveline component 120. As seen in FIG. 2, the side access opening 138 and bottom access opening 140 are positioned in the middle of the driveline component 120 forward of where the rear wheels 114 attach and behind where the front wheels 114 attach. The terms "front" and "forward" are used throughout the disclosure to indicate a direction toward the front of the work vehicle 110 and the terms "back" and "rear" are used to indicate a direction toward the back of the work vehicle 110. The driveline component 120 further includes a rear cover 142 at the rear end 122 that may be removed to provide access to at least a portion of the PTO assembly 130 inside of the driveline component 120. For example, the driveline component 120 may define a rear access opening that is covered by the rear cover 142. The PTO assembly 130 includes an input arrangement 144, a PTO shaft 152, a first gear train 154, the rear PTO arrangement 132, a countershaft 156, the side auxiliary removable middle PTO arrangement 136, and the bottom auxiliary removable middle PTO arrangement 134. The input arrangement 144 is coupled to a rotatable drive shaft (not shown) driven by the engine system 118. The engine system 118 may also be positioned within the forward end 124 of the driveline component 120 and mechanically coupled to the input arrangement 144 allowing the engine system 118 to drive the input arrangement 144.

Figure 4:
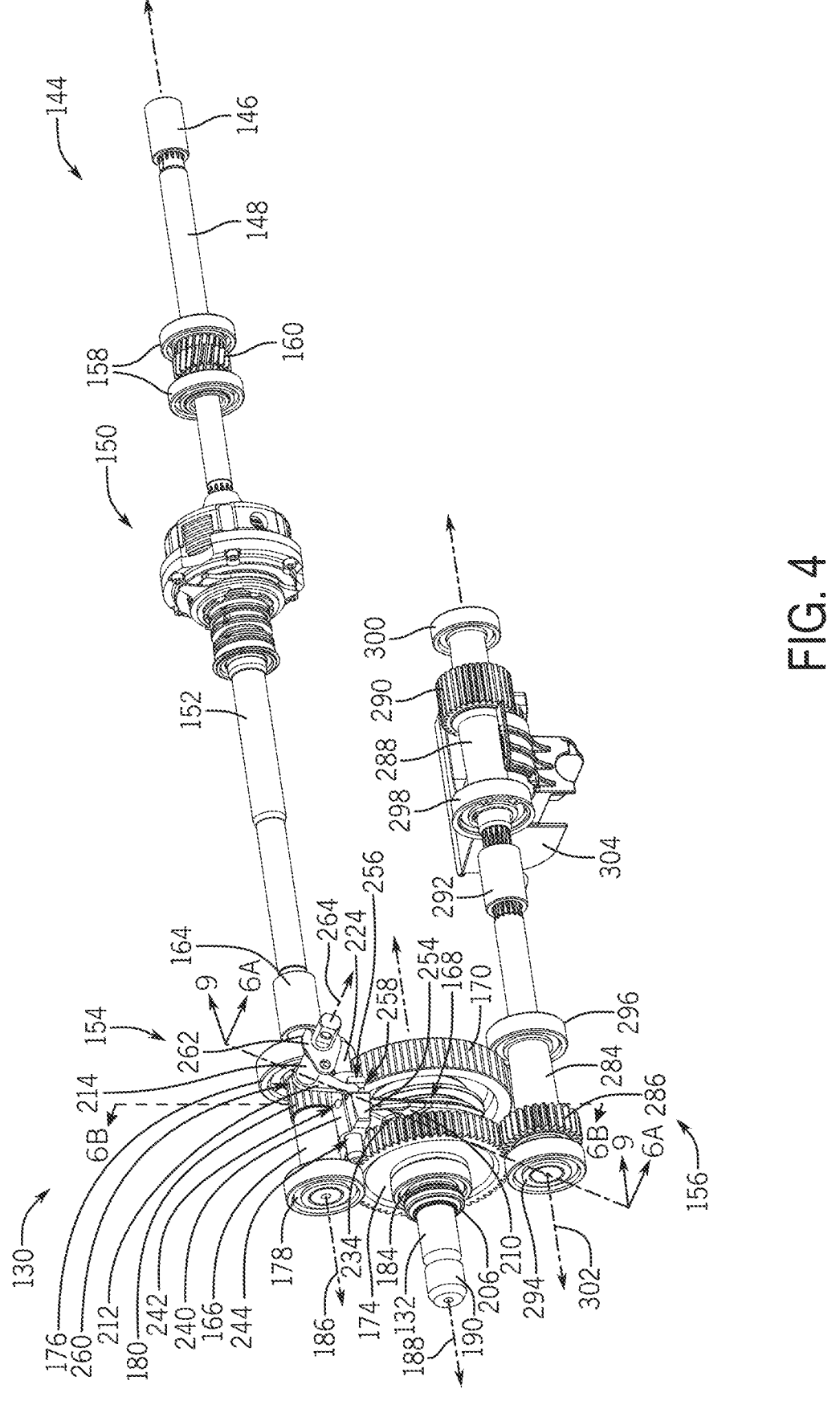
FIG. 4 is another perspective view of thereof.

Referring also to FIG. 4, the input arrangement 144 includes a input coupler 146, a input shaft 148, and a PTO clutch assembly 150. The input coupler 146 mechanically couples the input shaft 148 to a drive shaft (not shown)

driven by the engine system 118. For example, input shaft 148 and drive shaft may both insert into the input coupler 146 and internal splines within the input coupler 146 may mate with external splines on the input shaft 148 and external splines on the drive shaft. This allows the drive shaft to drive the input shaft 148 such that the input shaft 148 rotates with the drive shaft and the drive shaft transfers rotational power from the engine system 118 to the input shaft 148. The input shaft 148 extends through two input shaft bearings 158. These bearings 158 may be supported by the driveline component 120 and support the input shaft 148 allowing the input shaft 148 to rotate relative to the bearings 158. An input shaft gear 160 may be positioned between the bearings 158. The input shaft gear 160 may be driven by the input shaft 148. For example, the input shaft gear 160 may include internal splines that mate with external splines on the input shaft 148. The input shaft gear 160 may be coupled with another gear arrangement (not shown) to drive that gear arrangement based on the rotational power from the engine system 118.

The PTO clutch assembly 150 mechanically couples the input shaft 148 to the PTO shaft 152. When the PTO clutch assembly 150 is engaged, the PTO shaft 152 is driven by the input shaft 148 and the rotational power provided to the PTO shaft 152 from the engine system 118 is transferred to the PTO shaft 152. As such, the PTO shaft 152 rotates with the input shaft 148. When the PTO clutch assembly 150 is disengaged, the PTO shaft 152 is no longer driven by the engine and the PTO shaft 152 does not rotate with the input shaft 148. The PTO clutch assembly 150 may include a clutch pack that includes a plurality of friction discs that when compressed together engage the PTO clutch assembly 150. For example, every other friction disc may be mechanically coupled to the PTO shaft 152 with the remaining friction discs mechanically coupled to the input shaft 148. When the friction discs are compressed together, the friction discs all rotate together, and as such, the input shaft 148 and the PTO shaft 152 rotate together. In one aspect, the PTO clutch assembly 150 may be hydraulically engaged or disengaged. For example, the PTO clutch assembly 150 may be a hydraulically applied spring released clutch.

Figure 5:
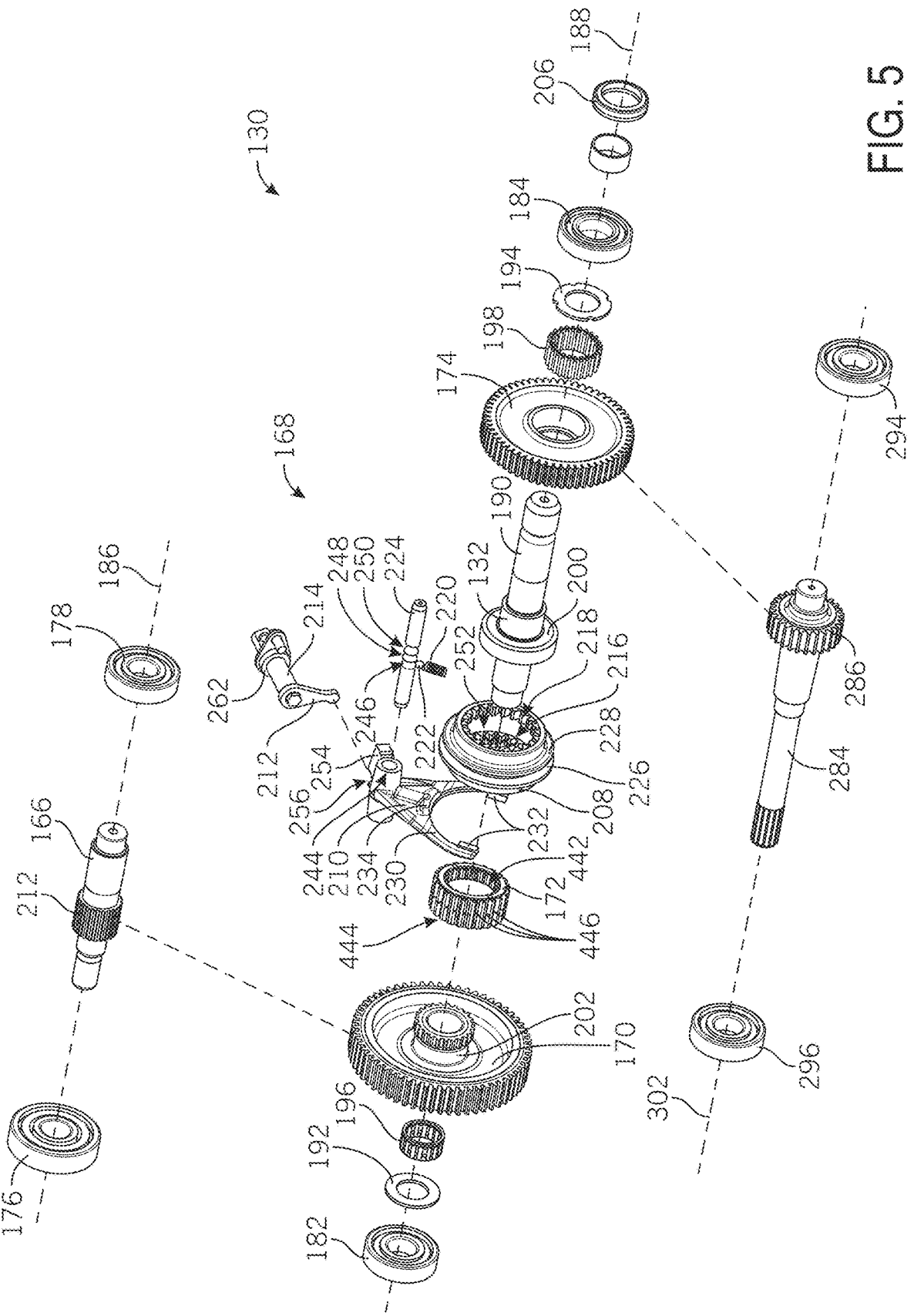
FIG. 5 is an exploded view of the PTO assembly of FIG. 4.

Referring also to FIGS. 4 and 5, the PTO shaft 152 extends along the driveline component 120 and is mechanically coupled to drive the first gear train 154. The first gear train 154 includes a first coupler 164, a gear train input shaft 166, a PTO shifter arrangement 168, a first gear 170, a coupler sleeve 172, and a second gear 174. The first coupler 164 mechanically couples the PTO shaft 152 to the gear train input shaft 166. For example, gear train input shaft 166 and PTO shaft 152 may insert into the first coupler 164 and internal splines within the first coupler 164 mate with external splines on the gear train input shaft 166 and external splines on the PTO shaft 152. This allows the PTO shaft 152 to drive the gear train input shaft 166 such that the gear train input shaft 166 rotates with the PTO shaft 152. As such, when the PTO clutch assembly 150 is engaged, the PTO shaft 152 transfers rotational power from the input shaft 148 and engine system 118 to the gear train input shaft 166.

The gear train input shaft 166 may extend through two bearings, a first bearing 176 positioned toward a forward end of the gear train input shaft 166 and a second bearing 178 positioned toward a rearward end of the gear train input shaft 166. These bearings 176, 178 may be supported by the driveline component 120 and support the gear train input shaft 166 allowing the gear train input shaft 166 to rotate relative to the bearings 176, 178. The gear train input shaft 166 defines a first rotation axis 186 and rotates about this axis. The gear train input shaft 166 is mechanically coupled to drive the first gear 170. For example, the gear train input shaft 166 may include a splined section 180 that is meshed with the first gear 170, where the splined section 180 may mate with gear teeth or external splines of the first gear 170. As another example, instead of having a splined section 180 mating with the first gear 170, the gear train input shaft 166 may be mated with a gear that rotates about the first rotation axis 186 and that gear may be mated with the first gear 170. In either case, the gear train input shaft 166 is mechanically coupled to the first gear 170 such that rotation of the gear train input shaft 166 drives the first gear 170.

The first gear 170 is mechanically coupled to a PTO shifter arrangement 168 and the PTO shifter arrangement 168 may mechanically change what the first gear 170 is driving. In a first position of the PTO shifter arrangement 168 shown in FIGS. 6A and 6B, the first gear 170 drives only the rear PTO arrangement 132. In a second position of the PTO shifter arrangement 168 shown in FIGS. 7A and 7B, the first gear 170 drives both the rear PTO arrangement 132 and the second gear 174. As shown in FIG. 4, the second gear being meshed to drive the countershaft 156. In a third position of the PTO shifter arrangement 168 shown in FIGS. 8A and 8B, the first gear 170 drives only the second gear 174 which in turn drives the countershaft 156. The countershaft 156 extends forward to a position in the middle of the work vehicle 110. At this position, the countershaft 156 may be mechanically coupled to drive the bottom auxiliary removable middle PTO arrangement 134 (FIGS. 10A-10C) and/or the side auxiliary removable middle PTO arrangement 136 (FIGS. 11A-11C).

The rear PTO arrangement 132 defines a second rotation axis 188. In at least one aspect, the rear PTO arrangement 132 is a rear PTO shaft. The rear PTO arrangement 132 extends through two bearings 182, 184 positioned along the second rotation axis 188. The bearings 182, 184 support the rear PTO arrangement 132. The bearing 182 is positioned towards the front of the rear PTO arrangement 132 and the bearing 184 is positioned towards the rear of the rear PTO arrangement 132. The bearings 182, 184 allow the rear PTO arrangement 132 to rotate about the second rotation axis 188. The rear PTO arrangement 132 includes a rear PTO output shaft 190 that extends out of the rear cover 142 of the driveline component 120 as shown in FIG. 2. In at least one aspect, the rear PTO output shaft 190 is integrally formed with the rear PTO arrangement 132. The rear PTO output shaft 190 may be attachable or coupleable to a work vehicle implement to drive it. For example, the rear PTO output shaft 190 may be splined so that it may mate with a driving member of an implement. The rear PTO output shaft 190 may have 6 straight splines, 15 splines, 20 involute splines, 21 involute splines, 22 involute splines. Additionally or alternatively, the rear PTO output shaft 190 may include any other manner to mechanically couple the rear PTO output shaft 190 to drive an implement. These implements may vary based on the operation being performed by the work vehicle.

The rear PTO arrangement 132 extends through a seal cap 206. The seal cap 206 is positioned within the rear cover 142. The seal cap 206 prevents fluid such as oil or hydraulic fluid from leaking out through the opening between the rear cover 142 and the rear PTO arrangement 132.

The first gear 170 and the second gear 174 are positioned on the second rotation axis 188 around the rear PTO arrangement 132. A bearing 196 is positioned between the first gear 170 and the rear PTO arrangement 132, and a bearing 198 is positioned between the second gear 174 and the rear PTO arrangement 132. The bearings 196, 198 allow the first gear 170 and the second gear 174 to rotate relative to the rear PTO arrangement 132, respectively. As such, the rear PTO arrangement 132 supports the first gear 170 and the second gear 174. The first gear 170 and the second gear 174 may be positioned between the bearing 182 and the bearing 184 positioned on the rear PTO arrangement 132. A first spacer 192 (e.g., a washer) may be positioned between the bearing 182 and the first gear 170, and a second spacer 194 (e.g., a washer) may be positioned between the bearing 184 and the second gear 174.

The rear PTO arrangement 132 may include an output gear 200 that radially extends between the first gear 170 and the second gear 174. In one aspect, the output gear 200 may be an integral part of the rear PTO arrangement 132 such as a radial protrusion from the rear PTO arrangement 132. In an alternative aspect, the output gear 200 may engage with the rear PTO arrangement 132 and rotate with the rear PTO arrangement 132. For example, the output gear 200 may have internal splines that engage with external splines of the rear PTO arrangement 132.

The first gear 170 may include a first annular hub 202 that may extend away from a base of the first gear 170 along the second rotation axis 188 toward the second gear 174. For example, the first annular hub 202 may extend a distance axially along the rotation axis 188 from the first gear 170 to proximate the output gear 200. In at least one aspect, the first annular hub 202 may be an integral part of the first gear 170. For example, the first annular hub 202 may be a protrusion from the first gear 170. In an alternative aspect, the first annular hub 202 may be attached or mounted to the first gear 170.

The second gear 174 includes a second annular hub 204 that may extend away from a base of the second gear 174 along the second rotation axis 188 toward the first gear 170. For example, the second annular hub 204 may extend a distance axially along the rotation axis 188 from the second gear 174 to proximate the output gear 200 on the opposite side from the first annular hub 202. In at least one aspect, the second annular hub 204 may be an integral part of the second gear 174. For example, the second annular hub 204 may be a protrusion from the second gear 174. In an alternative aspect, the second annular hub 204 may be attached or mounted to the second gear 174.

The first annular hub 202 may be positioned against a first side of the output gear 200 and the second annular hub 204 may be positioned against a second side of the output gear 200. The second side being opposite the first side of the output gear 200. The first annular hub 202 and the second annular hub 204 each include external splines. The first annular hub 202 is mechanically coupled to the PTO shifter arrangement 168. For example, the external splines of the first annular hub 202 may be mechanically coupled with the PTO shifter arrangement 168. The second annular hub 204 may be mechanically coupled to the PTO shifter arrangement 168 based on the position of the PTO shifter arrangement 168. For example, when the PTO shifter arrangement 168 is in the second position or third position, then the external splines of the second annular hub 204 may be mechanically coupled with the PTO shifter arrangement 168.

The coupler sleeve 172 may be positioned coaxially around the first annular hub 202 along the rotation axis 188 and extend the same distance axially along the rotation axis 188 as the first annular hub 202. As such, the coupler sleeve 172 is positioned between the first gear 170 and the second gear 174. The coupler sleeve 172 may include internal splines 442 and external splines 444. The external splines 444 of the coupler sleeve 172 may extend the entire length of the coupler sleeve 172. The external splines on the first annular hub 202 may mate with the internal splines 442 of the coupler sleeve 172. As such, the coupler sleeve 172 rotates with the first gear 170. In some aspects, the first annular hub 202 includes two radial diameters and the coupler sleeve 172 includes two internally matching radial diameters such that the coupler sleeve 172 may be positioned around the first annular hub 202. In some aspects, the smaller diameter section includes the external splines and the internal splines 442 between the first annular hub 202 and the coupler sleeve 172, respectively. The first annular hub 202 is mechanically coupled to the PTO shifter arrangement 168 through the coupler sleeve 172. For example, the external splines 444 on the coupler sleeve 172 may mate with the PTO shifter arrangement 168. In an alternative aspect, the coupler sleeve 172 may not be needed and the first annular hub 202 may be sized differently to mate with the PTO shifter arrangement 168. However, in this aspect, the PTO shifter arrangement 168 would have less axial distance along the rotation axis 188 to be engaged with the first annular hub 202 than with the coupler sleeve 172. This is due to the external splines on the first annular hub 202 not being able to be positioned against the base of the first gear 170 due to manufacturing constraints of cutting the external splines out of the first annular hub 202. At least if the first annular hub 202 is integrally formed with the first gear 170. Using the coupler sleeve 172 allows the external splines 444 to be positioned against the base of the first gear 170 and extend the entire length of the first annular hub 202.

As shown in FIGS. 4-8B, the first gear 170 has a first width at the external splines and a second width that extends toward the rear PTO arrangement 132. The second width being less than the first width. The first annular hub 202 may be integrally formed with and extend away from the second width. The shape of the first gear 170 defines a space 236 between the first annular hub 202 and externally splined section at the radially outer end of the first gear 170. At least a portion of the PTO shifter arrangement 168 may be positioned within the space 236. Similarly, the second gear 174 defines a similar space 238 between the second protrusion and the externally splined section at the radially outer end of the second gear 174. When the PTO shifter arrangement 168 is in the second or third position, a portion of the PTO shifter arrangement 168 may be positioned within the space 238 defined by the second gear 174. In some aspects, the first gear 170 and the second gear 174 may be designed to have the spaces 236, 238 to minimize the overall space required for the first gear train 154. For example, the PTO shifter arrangement 168 may need to have a specific travel distance to move between the three positions of the PTO shifter arrangement 168. Without the spaces 236, 238, then the axial distance needed for the first gear train 154 would be greater since the PTO shifter arrangement 168 would still need to move the same axial distance.

The PTO shifter arrangement 168 includes a shifting ring 208, a shifting member 210, a biasing member 220, a spherical member 222, a static shaft 224, a shifting arm 212, and a shifting shaft 214. The shifting ring 208 is positioned around the second rotation axis 188 and around the coupler sleeve 172. The shifting ring 208 extends along the second rotation axis 188. As shown in FIGS. 6A-8B, the first gear 170, coupler sleeve 172, the second gear 174, and the shifting ring 208 are each position coaxially with the rear PTO arrangement 132.

The shifting ring 208 includes internal input splines 216 and internal output splines 218. The internal output splines 218 are spaced apart from the internal input splines 216 along the rotation axis by a gap 252. The internal input splines 216 are positioned toward a front end of the shifting ring 208 and the internal output splines 218 are positioned toward the rear end of the shifting ring 208 with the gap 252 defined between them. The internal input splines 216 may include first input splines 436 and second input splines 438. The second input splines 438 may be spaced apart from the first input splines 436 along the rotation axis 188 by a gap 440.

The internal input splines 216 may be in sliding engagement with the external splines 444 of the coupler sleeve 172. The splines 216, 218 extend or protrude radially toward the second rotation axis 188. The internal input splines 216 may mesh with external splines 444 on the coupler sleeve 172. The external splines 444 extending the entire length of the coupler sleeve 172 allow the internal input splines 216 to engage the external splines 444 anywhere along the length of the coupler sleeve 172. This helps to maximize the distance usable by the shifting ring 208 along the rotation axis 188 since the coupler sleeve 172 is positioned against the base of the first gear 170 and extends the length of the first annular hub 202 as discussed previously.

The internal output splines 218 may engage with the splines positioned on the output gear 200 of the rear PTO arrangement 132, the external splines positioned on the second annular hub 204 of the second gear 174, or both the splines positioned on the output gear 200 and the external splines positioned on the second annular hub 204 based on the position of the shifting ring 208. The shifting ring 208 may be moved along the second rotation axis 188 by the shifting member 210 to be in one of the three different positions described previously.

Figure 5A:
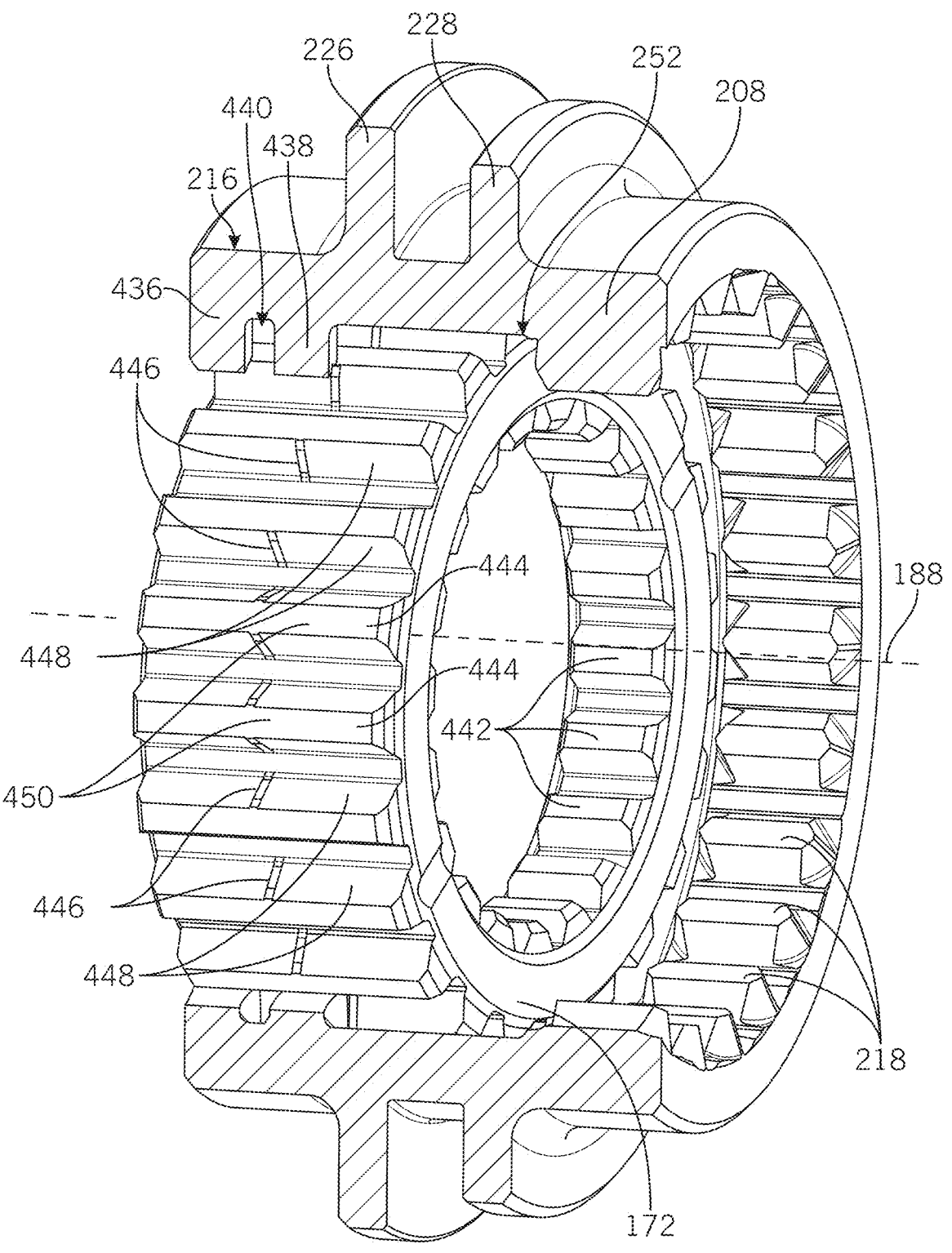
FIG. 5A is a detailed view of a shifting ring and coupler sleeve of the PTO assembly of FIG. 4.

Referring also to FIG. 5A, the coupler sleeve 172 may include a locking feature 446 configured to prevent the shifting ring 208 from moving axially along the rotation axis 188 to a different shifter position when the shifting ring 208 is rotating with the coupler sleeve 172. For example, the torque being transferred to the shifting ring 208 from the coupler sleeve 172 may allow the locking feature 446 to prevent the shifting ring 208 from moving axially to a different shifter position. The locking feature 446 may be positioned on both flanks 448 (i.e., side) of each external spline 444. For example, the locking feature 446 may be a protrusion extending away from each flank 448 of every external spline 444. In at least one aspect, the locking feature 446 may be formed through swedging the coupler sleeve 172 to form the protrusions on each external spline 444. For example, the external splines 444 of the coupler sleeve 172 may be compressed everywhere except the location of the locking feature 446 to form a protrusion at that location. In at least one aspect, the locking feature is not at the top 450 (i.e., crest) of each external spline 444. As such, there is not a protrusion extending away from the top 450 of the external spline 444. Since the locking feature 446 may be formed through swedging, it may not be possible to form the locking feature 446 on an annular hub of a gear since access to both sides of the locking feature 446 may be required.

As discussed above, the internal input splines 216 of the shifting ring 208 may include first input splines 436 and second input splines 438 separated by a gap 440. As shown in FIGS. 6B, 7B, and 8B, the first input splines 436 and second input splines 438 engage the external splines 444 of the coupler sleeve 172 at a different axial position along the rotation axis 188 for each shifter position of the shifting ring 208. Referring to FIG. 5A and FIG. 6B, in the first position, the locking feature 446 may be positioned to the right of both input splines 436, 438 between the internal input splines 216 and the internal output splines 218. For example, in the first position, the locking feature 446 may be positioned in the gap 252. Referring to FIG. 5A and FIG. 7B, in the second position, the locking feature 446 may be positioned within the gap 440 between the two input splines 436, 438. Referring to FIG. 5A and FIG. 8B, in the third position, the locking feature 446 may be positioned to the left of both input splines 436, 438 and outside of the shifting ring 208. When the coupler sleeve 172 and shifting ring 208 are rotating together (e.g., when the PTO clutch assembly 150 is engaged) the internal input splines 216 (i.e., input splines 436, 438) are engaged and pressing against the external splines 444 of the coupler sleeve 172. For the shifting ring 208 to move to a different shifter position, the shifting ring may need to slide axially along to rotation axis 188 to change its position and the internal input splines 216 would have to slide past the locking feature 446. While the coupler sleeve 172 and shifting ring 208 are rotating together, if the shifting ring 208 slides toward a different shifter position, then the internal input splines 216 would contact the locking feature 446 preventing the shifting ring 208 from changing position while it is rotating. For example, the torque being transferred from the coupler sleeve 172 to the shifting ring 208 during rotation may apply a force between them that prevents the internal input splines 436, 438 from sliding past the locking feature 446.

When the shifting ring 208 and the coupler sleeve are not rotating (e.g., when the PTO clutch assembly 150 is disengaged), then the two sets of internal input splines 436, 438 may slide past the locking features 446 to position the shifting ring 208 in first, second, or third position. For example, the locking features 446 may protrude small enough to allow the internal input splines 436, 438 to slide past the locking features 446 when the shifting ring 208 is not rotating, and the locking features 446 may contact the shifting ring 208 and prevent the internal input splines 436, 438 from siding past the locking features 446 if the shifting ring 208 is moved axially when the shifting ring 208 is rotating. In at least one aspect, the protrusions on the flanks 448 of the splines 444 at the location of the locking features 446 may make the spline 444 thicker (e.g., 1 mm thicker, 2 mm thicker, 5 mm thicker, etc.) at the locking feature 446 than the rest of the spline 444. The first input splines 436, second input splines 438, and gap 440 may be designed to work with the locking feature 446 to prevent the shifting ring 208 from moving along the rotation axis 188 to a different shifter position when the PTO clutch assembly 150 is engaged and the shifting ring 208 is rotating.

Figure 9:
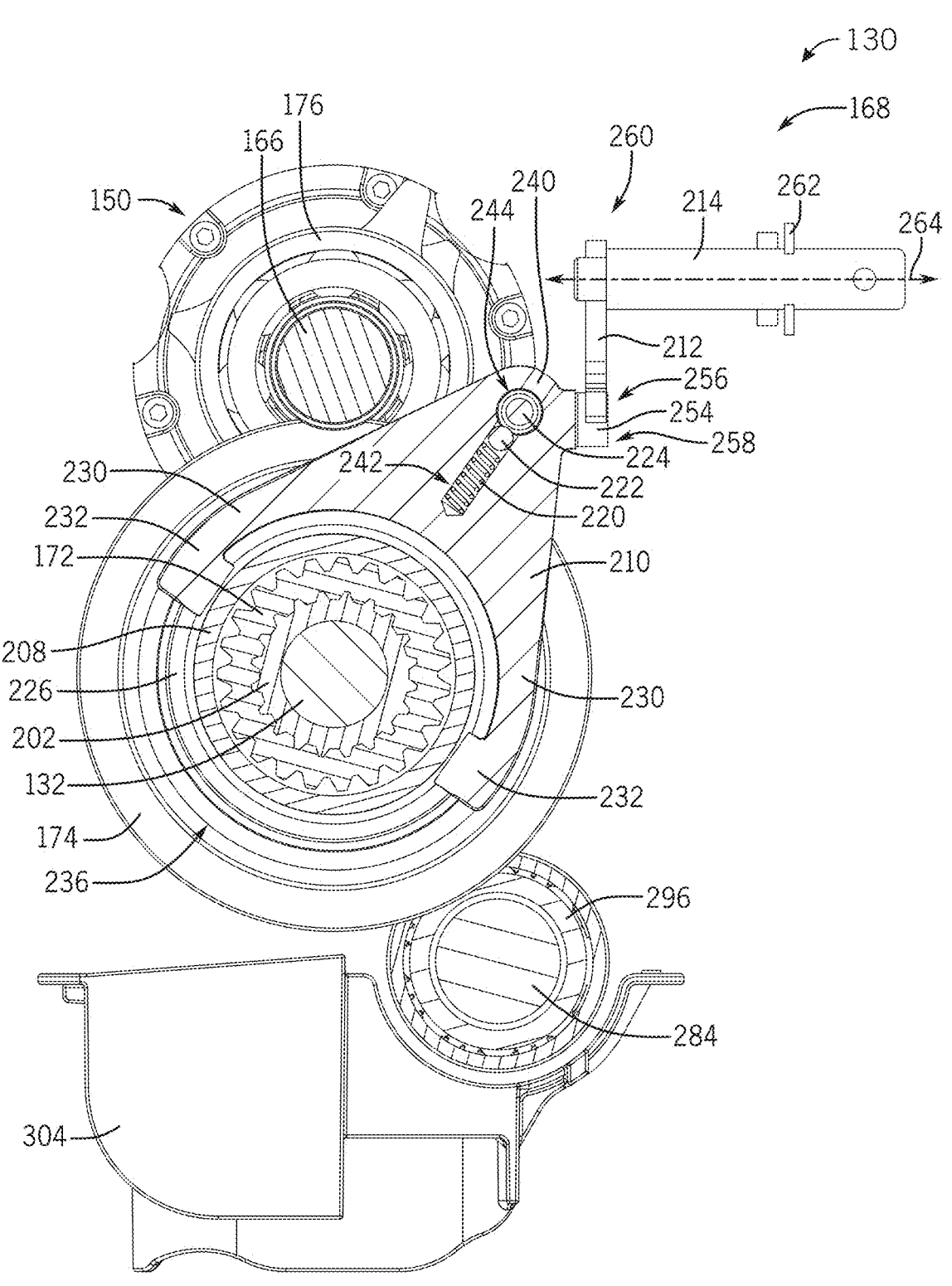
FIG. 9 is a cross-sectional view of the PTO assembly taken along line 9-9 in FIG. 4.

The shifting ring 208 includes a first radially extending protrusion 226 and a second radially extending protrusion 228 spaced longitudinally from the first radially extending protrusion 226. Referring also to FIG. 9, the shifting member 210 includes two arms 230 that extend toward the second rotation axis 188 and reach around the shifting ring 208 on two sides. The two arms 230 are positioned between the first radially extending protrusion 226 and the second radially extending protrusion 228. Each arm 230 ends with a protrusion 232 that extends toward the shifting member 210 and the second rotation axis 188. The protrusions 232 press against either the first radially extending protrusion 226 or the second radially extending protrusion 228 to move the shifting ring 208 between the three positions of the PTO shifter arrangement 168. The shifting member 210 includes a protrusion 234 (FIG. 4) that extends along the second rotation axis 188. The protrusion 234 may be positioned against the radially outer surface of the second radially extending protrusion 228. In some aspects, the protrusion 234 may act as a stop to help position the arms 230 and protrusions 232 at the optimal position on the shifting ring 208. As shown in FIG. 9, the protrusions 232 are positioned on opposing sides of the shifting ring 208.

The shifting member 210 extends away from the second rotation axis 188 and ends at a protrusion 240. The protrusion 240 extends on both sides of the shifting member 210 in a direction along the second rotation axis 188. The protrusion 240 is positioned away from the second rotation axis 188 at a radial distance greater than the radius of the first gear 170 or the second gear 174. For example, the shifting member 210 extends far enough away from the second rotation axis 188 that the protrusion 240 is positioned outside of the first gear 170 or second gear 174. The shifting member 210 defines a first hole 242 through the protrusion 240 and toward the second rotation axis 188. The first hole 242 does not extend entirely though the shifting member 210. The protrusion 240 defines a second hole 244 that extend completely through the protrusion 240 in a direction along the second rotation axis 188. The two holes 242, 244 cross inside of the protrusion 240.

The biasing member 220 and the spherical member 222 are inserted into the first hole 242 with the biasing member 220 being inserted before the spherical member 222. Then the static shaft 224 is inserted into the second hole 244 after the biasing member 220 and spherical member 222 have been inserted. The biasing member 220 applies a biasing force on the spherical member 222 to press the spherical member against the static shaft 224. In at least one aspect, the biasing member 220 is a spring. In at least one aspect, the spherical member 222 is a metal ball.

The static shaft 224 extends out either side of the second hole 244. The ends of the static shaft 224 are fixed in place so that the static shaft does not move. For example, the ends of the static shaft may be mechanically coupled to the driveline component 120 to prevent the static shaft 224 from moving. The static shaft 224 being fixed in place allows the shifting member 210 to move relative to the static shaft 224. As such, the shifting member 210 may slide along the static shaft 224. As shown in FIGS. 6A-8B, the shifting member 210 moves between three positions on the static shaft 224. The three positions are defined by three channels 246, 248, 250 in the static shaft 224.

As the shifting member 210 is moved, the spherical member 222 is biased into one of the three channels 246, 248, 250. This process keeps the shifting member 210 in one of the three positions on the static shaft 224 corresponding to one of the three positions of the PTO shifter arrangement 168. To move the shifting member 210, the operator has to overcome the biasing force to compress the biasing member 220 and move the spherical member 222 out of one of the channels 246, 248, 250. The shifting member 210 then moves and the biasing force moves the spherical member 222 into another of the channels 246, 248, 250. The biasing force helps to keep the shifting member 210 in one of the three positions. For example, once the spherical member 222 is moved out of one of the channels 246, 248, 250, the channels 246, 248, 250 may be shaped and positioned such that the biasing force begins to press the spherical member 222 into another of the channels 246, 248, 250, which in turn, also applies a force to move the shifting member 210 to the correct position for the spherical member 222 to be positioned completely inside one of the channels 246, 248, 250. Additionally, as the operator moves the shifting member 210, the force required to move the shifting member 210 may change based on if the spherical member 222 is being moved out of or into a channel 246, 248, 250. This change in the force to move the shifting member 210 can be felt as feedback to the operator about the PTO shifter arrangement 168 being in the correct position to engage the desired PTOs.

Figure 6A:
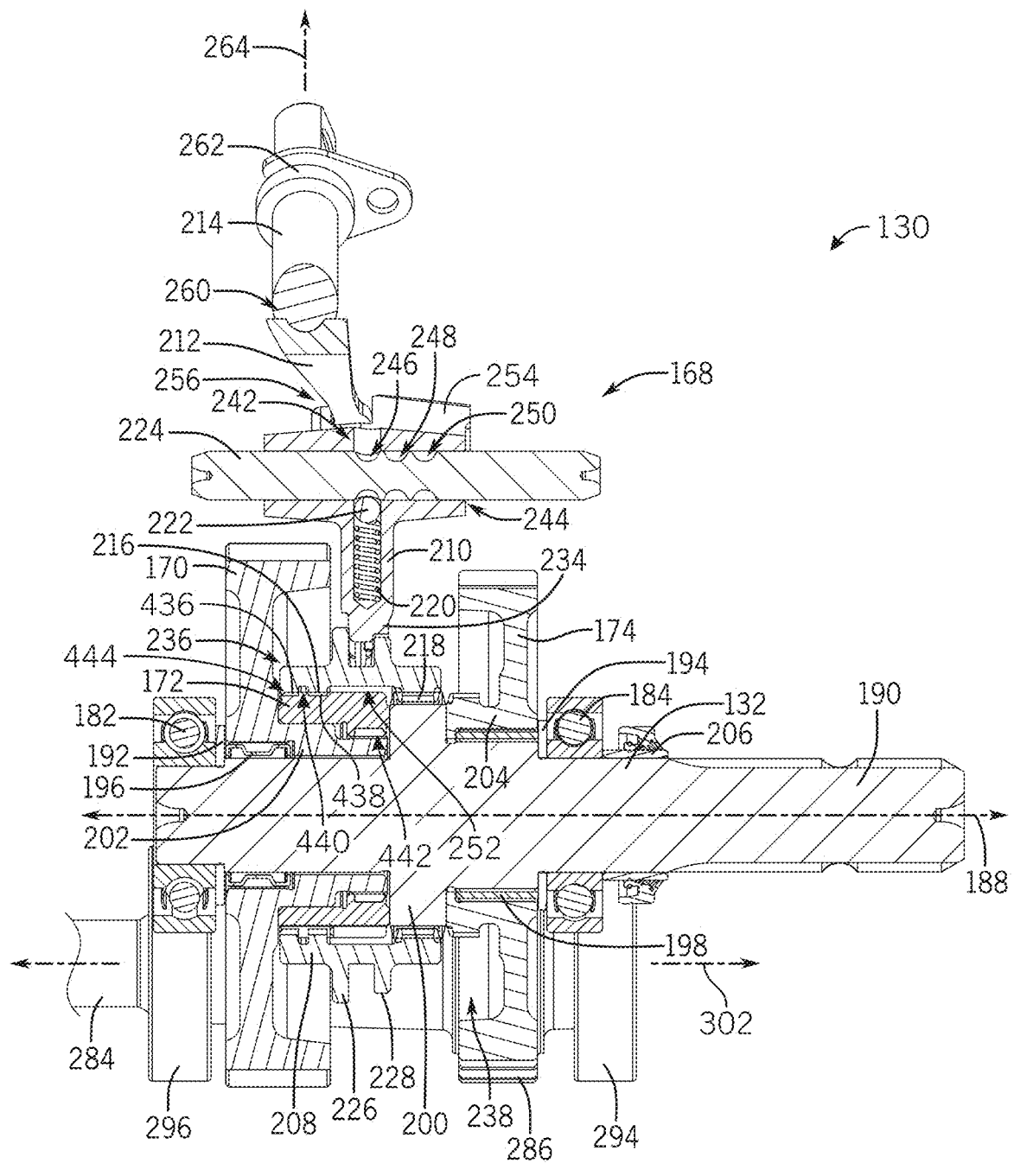
FIG. 6A is a cross-sectional view taken along line 6A-6A of FIG. 4 illustrating a first position of the PTO assembly.
Figure 6B:
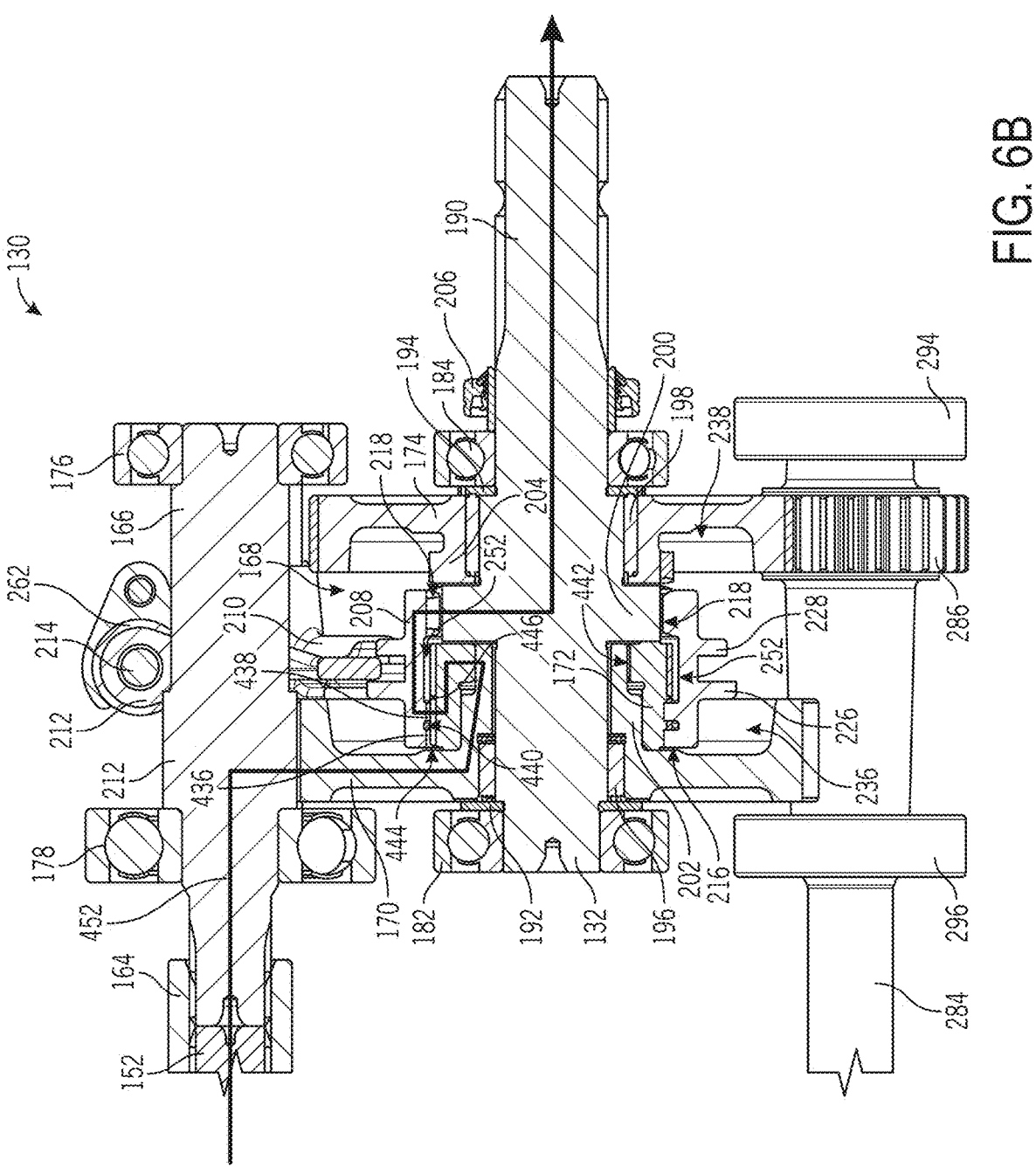
FIG. 6B is a cross-sectional view taken along line 6B-6B of FIG. 4 illustrating the first position of the PTO assembly.

In FIGS. 6A and 6B, the PTO shifter arrangement 168 is in the first position. In the first position, the PTO shifter arrangement 168 is positioned along the rotation axis 188 such that the spherical member 222 may be positioned within the first position channel 246 and the locking features 446 may be positioned within the gap 252. In the first position, the shifting ring 208 may have the internal input splines 216 (e.g., input splines 436, 438) engaged with the external splines 444 on the coupler sleeve 172 and the internal output splines 218 engaged with only the splines on the output gear 200 of the rear PTO arrangement 132. When the PTO clutch assembly 150 is engaged, the PTO shaft 152 may begin to rotate and the rotation power from the transmission may be transferred along the torque flow line 452 (FIG. 6B). The rotational power (i.e., torque) from the PTO shaft 152 may be transferred to the gear train input shaft 166, which is in engagement with the first gear 170 causing the first gear 170 to rotate. The rotation of the first gear 170 is transferred to the coupler sleeve 172 which is in engagement with the shifting ring 208 causing the shifting ring 208 to rotate. In the first shifter position, the shifting ring 208 is in engagement with only the output gear 200 causing the output gear 200 and rear PTO arrangement 132 to rotate. As such, the rear PTO arrangement 132 is driven by the first gear 170 when the PTO shifter arrangement 168 is in the first position.

Figure 7A:
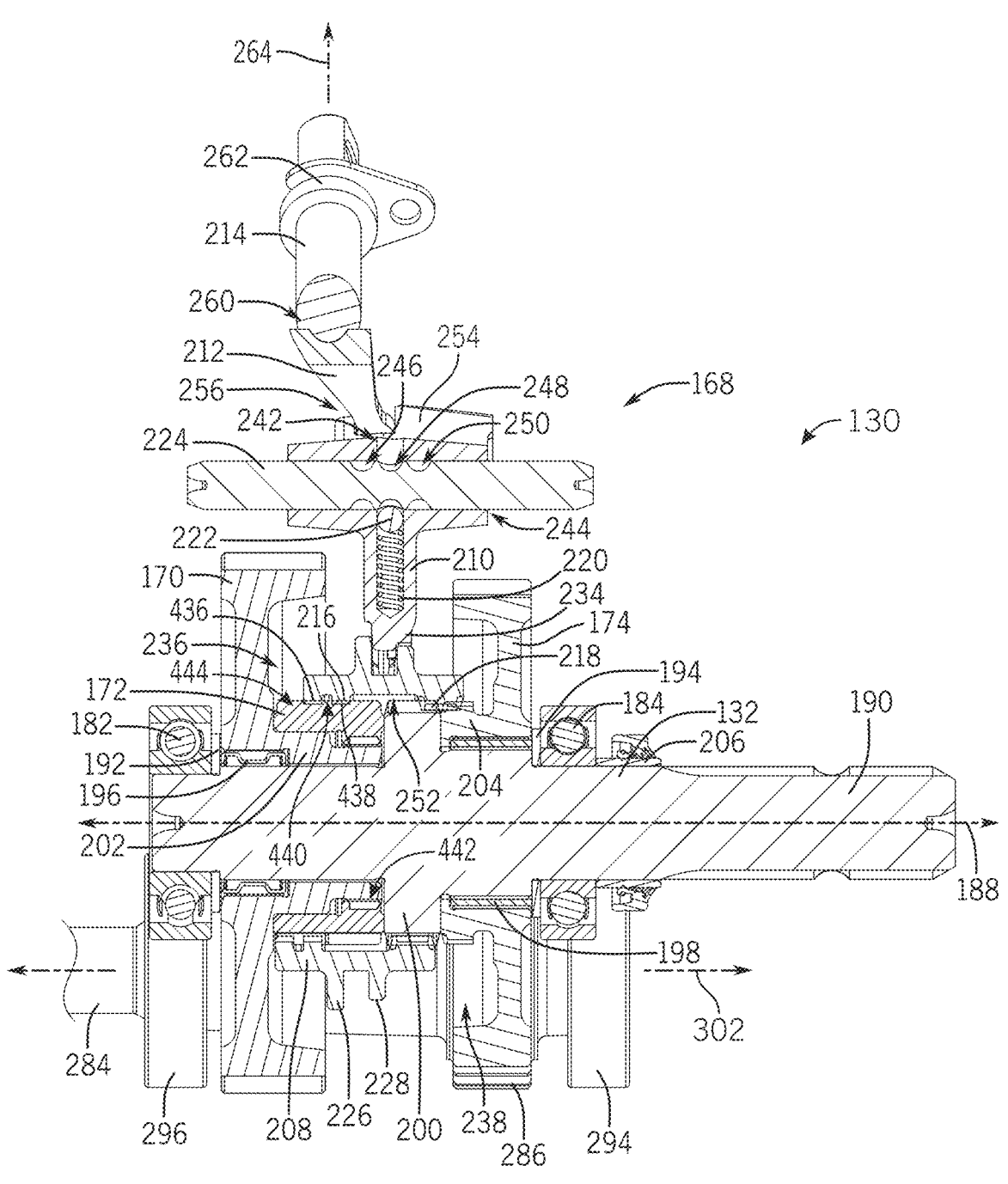
FIG. 7A is a cross-sectional view taken along line 6A-6A of FIG. 4 illustrating a second position of the PTO assembly.
Figure 7B:
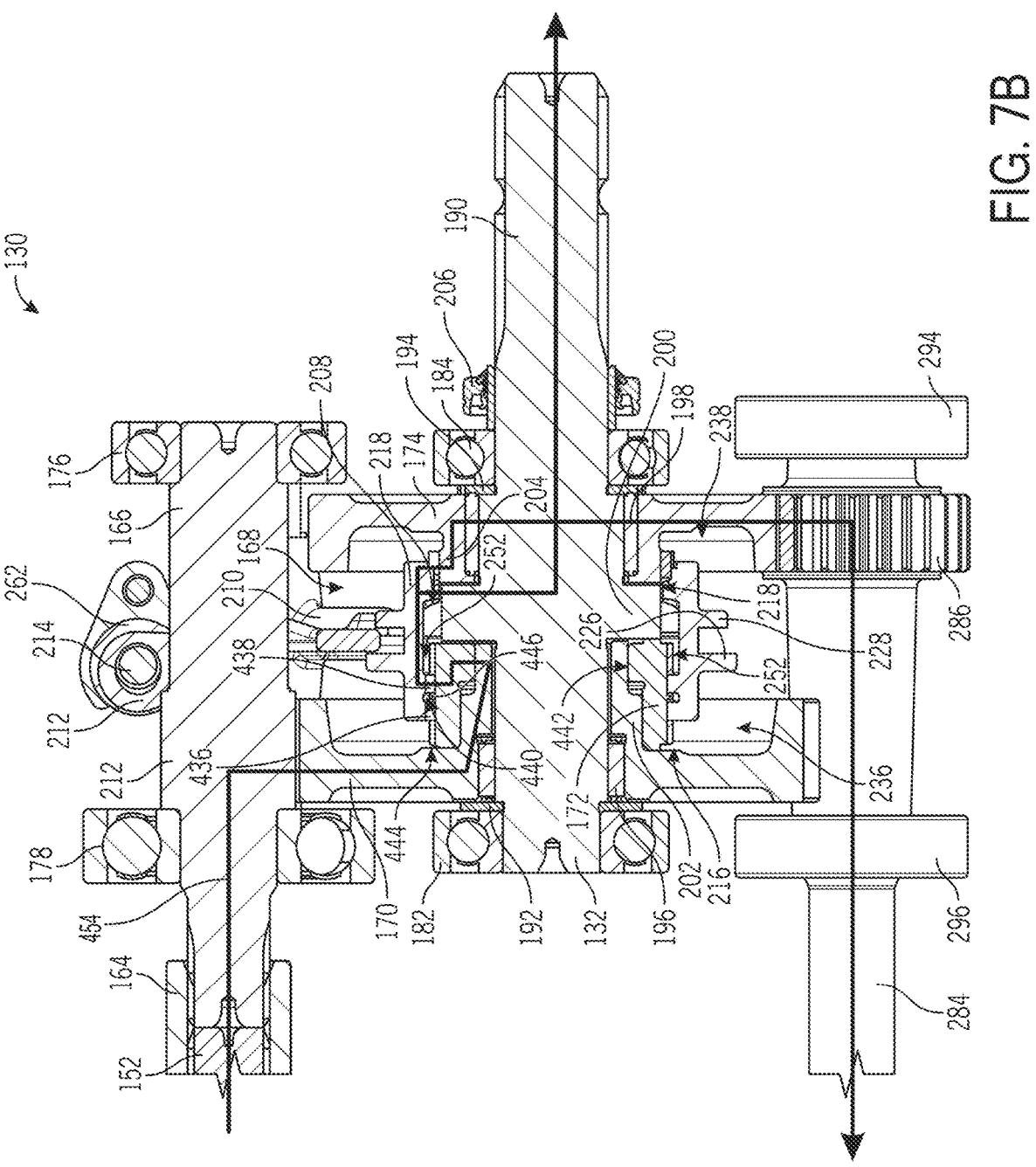
FIG. 7B is a cross-sectional view taken along line 6B-6B of FIG. 4 illustrating the second position of the PTO assembly.

In FIGS. 7A and 7B, the PTO shifter arrangement 168 is in the second position. In the second position, the PTO shifter arrangement 168 is positioned along the rotation axis 188 such that the spherical member 222 is positioned within the second position channel 248 and the locking features 446 may be positioned within the gap 440. In the second position, the shifting ring 208 may have the internal input splines 216 (e.g., input splines 436, 438) engaged with the external splines 444 on the coupler sleeve 172 and the internal output splines 218 engaged with both the splines on the output gear 200 of the rear PTO arrangement 132 and the external splines positioned on the second annular hub 204 of the second gear 174. For example, the shifting ring 208 may be positioned along the rotation axis 188 such that the internal output splines 218 engage with both the rear PTO arrangement 132 and the second gear 174. When the PTO clutch assembly 150 is engaged, the PTO shaft 152 may begin to rotate and the rotation power from the transmission may be transferred along the torque flow line 454 (FIG. 7B). The rotational power (i.e., torque) from the PTO shaft 152 may be transferred to the gear train input shaft 166, which is in engagement with the first gear 170 causing the first gear 170 to rotate. The rotation of the first gear 170 is transferred to the coupler sleeve 172 which is in engagement with the shifting ring 208 causing the shifting ring 208 to rotate. In the second shifter position, the shifting ring 208 is in engagement with both the output gear 200 and the second annular hub 204 of the second gear 174 causing the output gear 200, rear PTO arrangement 132, second annular hub 204, and second gear 174 to rotate. As such, both the rear PTO arrangement 132 and the second gear 174 are driven by the first gear 170 when the PTO shifter arrangement 168 is in the second position.

Figure 8A:
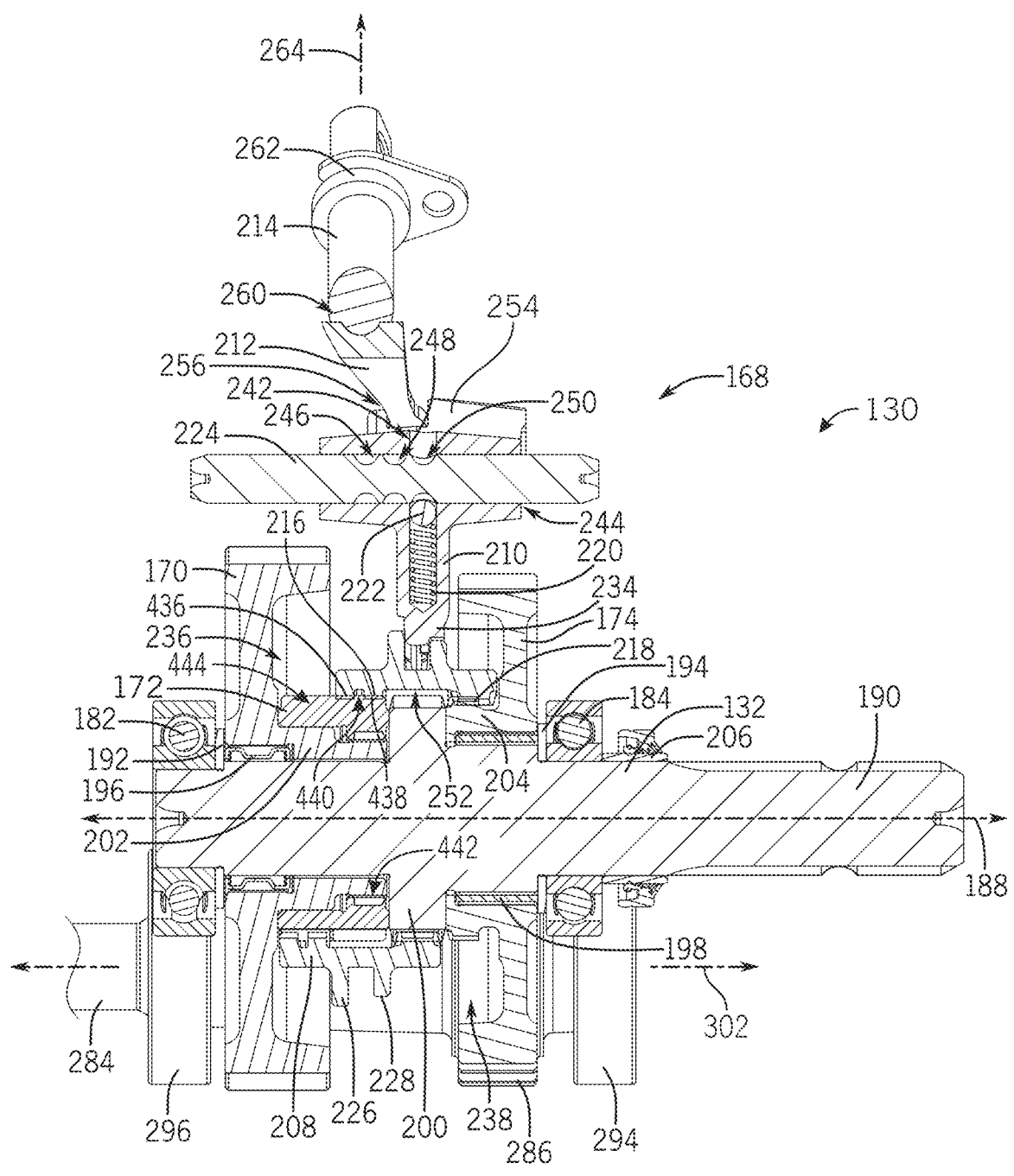
FIG. 8A is a cross-sectional view taken along line 6A-6A of FIG. 4 illustrating a third position of the PTO assembly.
Figure 8B:
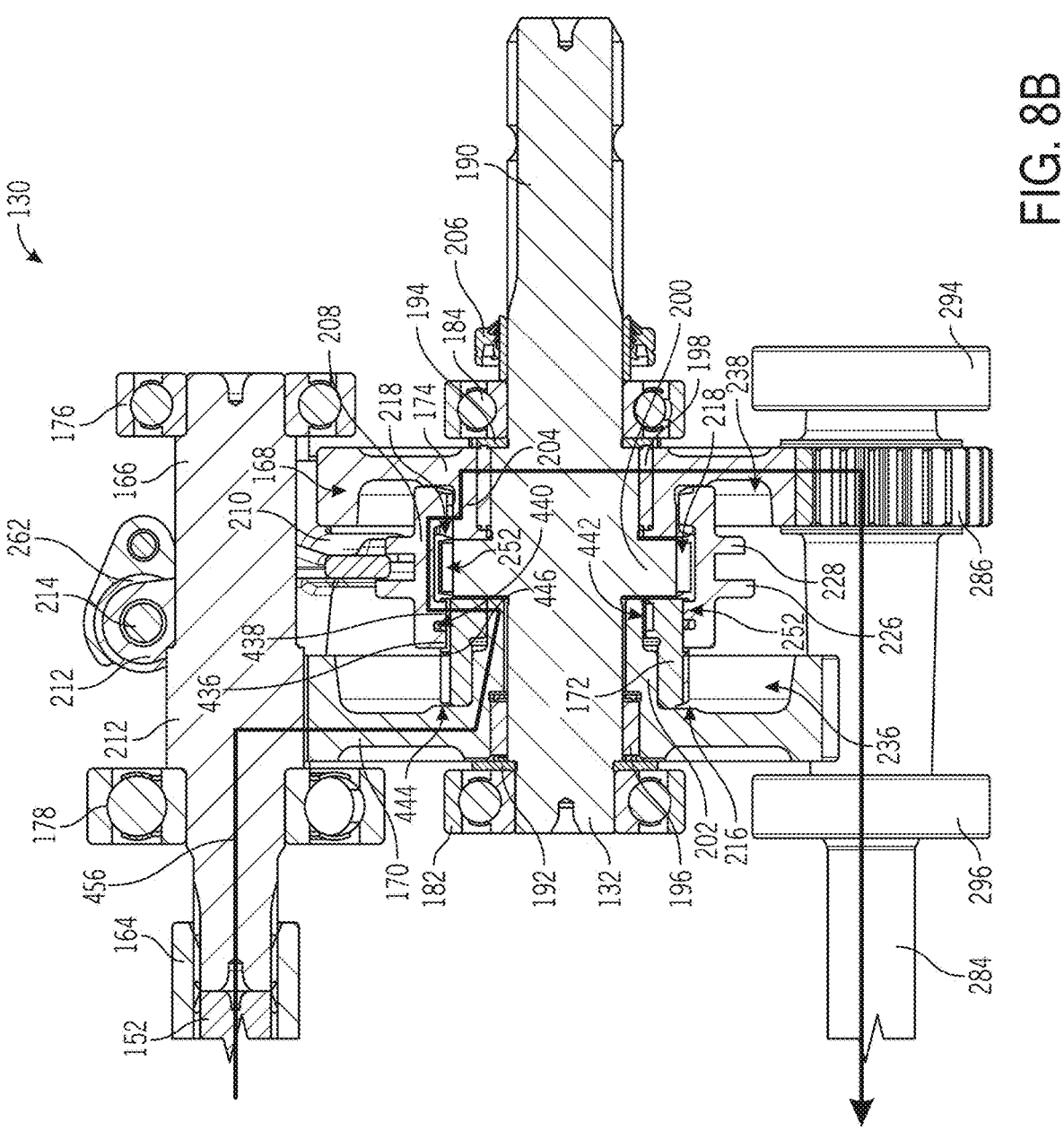
FIG. 8B is a cross-sectional view taken along line 6B-6B of FIG. 4 illustrating the third position of the PTO assembly.

In FIGS. 8A and 8B, the PTO shifter arrangement 168 is in the third position. In the third position, the spherical member 222 is positioned within the third position channel 250 and the locking features 446 may be positioned outside of the shifting ring 208. In the third position, the shifting ring 208 has the internal input splines 216 (e.g., input splines 436, 438) engaged with the external splines 444 on the coupler sleeve 172 and the internal output splines 218 are engaged with only the external splines positioned on the second annular hub 204 of the second gear 174. For example, in the third position, the shifting ring 208 may be positioned along the rotation axis 188 such that the output gear 200 of the rear PTO arrangement 132 is positioned within the gap 252 disengaging the internal output splines 218 from the output gear 200. Stated another way, in the third position, the gap 252 may be positioned over the splines on the output gear 200 of the rear PTO arrangement 132. As such, the splines on the output gear 200 are not engaged with the shifting ring 208. When the PTO clutch assembly 150 is engaged, the PTO shaft 152 may begin to rotate and the rotation power from the transmission may be transferred along the torque flow line 456 (FIG. 8B). The rotational power (i.e., torque) from the PTO shaft 152 may be transferred to the gear train input shaft 166, which is in engagement with the first gear 170 causing the first gear 170 to rotate. The rotation of the first gear 170 is transferred to the coupler sleeve 172 which is in engagement with the shifting ring 208 causing the shifting ring 208 to rotate. In the third shifter position, the shifting ring 208 is in engagement with only the second annular hub 204 of the second gear 174 causing the second annular hub 204 and second gear 174 to rotate. As such, the second gear 174 is driven by the first gear 170 when the PTO shifter arrangement 168 is in the third position. As shown in FIGS. 6A-8B, during movement and in each shifter position of the PTO shifter arrangement 168, the internal input splines 216 are meshed with the external splines on the coupler sleeve 172.

Also referring to FIGS. 4, 5, 6A, 7A, 8A, and 9, the shifting member 210 includes a protrusion 254 extending away from the protrusion 240. The protrusion 254 defining a channel 256. A bottom end 258 of the shifting arm 212 is positioned within the channel 256. In at least one aspect, the bottom end 258 is rounded to allow smooth movement within the channel 256. The shifting arm 212 extends from the bottom end 258 up away from the channel 256 to a top end 260. The shifting arm 212 is attached to the shifting shaft 214 at the top end 260.

The shifting shaft 214 extends away from the shifting arm 212. For example, the shifting shaft 214 may extend perpendicularly away from the shifting arm 212. The shifting shaft 214 extends away and out of the driveline component 120 as shown in FIG. 2. The shifting shaft 214 extends through a mounting bracket 262. The mounting bracket 262 is attached to the driveline component 120 and supports the shifting shaft 214. The mounting bracket 262 helps hold the shifting shaft 214 in position while allows the shifting shaft 214 to rotate about itself. For example, the shifting shaft 214 defines a third rotation axis 264. The shifting shaft 214 may rotate about the third rotation axis 264. Outside of the driveline component 120, the shifting shaft 214 may be attached to a level arm (not shown) that may be moved by the operator to rotate the shifting shaft 214 about the third rotation axis 264.

The rotation of the shifting shaft 214 causes the shifting arm 212 to rotate about the third rotation axis 264, which in turn causes the bottom end 258 of the shifting arm 212 to press against the protrusion 254 in the shifting member 210. The shifting arm 212 to pressing against the protrusion 254 causes the shifting member 210 to move along the static shaft 224. As such, the operator may move a lever arm attached to the shifting shaft 214 to position the rear PTO arrangement 132 in any of the three positions and engaged whichever PTOs are desired by the operator.

In the first position of the PTO shifter arrangement 168, the rear PTO arrangement 132 may be driven. In the second position of the PTO shifter arrangement 168, the rear PTO arrangement 132 and auxiliary removable middle PTO arrangements 134 (FIGS. 10A-10C), 136 (FIGS. 11A-11C) may be driven. In the third position of the PTO shifter arrangement 168, the auxiliary removable middle PTO arrangements 134 (FIGS. 10A-10C), 136 (FIGS. 11A-11C) may be driven. The PTO shifter arrangement 168 can change between what PTOs may be driven when the PTO clutch assembly 150 is engaged. When the PTO clutch assembly 150 is disengaged, then no rotational power is transferred to any of the PTOs from the engine system 118.

Referring also to FIG. 4 and as stated previously, the second gear 174 drives the countershaft 156. The countershaft 156 extends forward to a position in the middle of the work vehicle 110. The countershaft 156 defines a fourth rotation axis 302. The countershaft 156 rotates around the fourth rotation axis 302. At this position, the countershaft 156 may be mechanically coupled to drive the bottom auxiliary removable middle PTO arrangement 134 (FIGS. 10A-10C) and/or the side auxiliary removable middle PTO arrangement 136 (FIGS. 11A-11C). The rear PTO arrangement 132 may be part of a first PTO arrangement and the countershaft 156 may be part of a second PTO arrangement. The second PTO arrangement may also include a middle or forward PTO arrangement (e.g., bottom auxiliary removable middle PTO arrangement 134 or side auxiliary removable middle PTO arrangement 136). In some aspects, the countershaft 156 may extend forward of the rear PTO arrangement to transfer torque to a middle or forward PTO arrangement when the second gear 174 is rotating.

The countershaft 156 includes a first shaft 284, an input gear 286, a second shaft 288, an output gear 290, a coupler 292, a first bearing 294, a second bearing 296, a third bearing 298, and a fourth bearing 300. The first shaft 284 extends through the first bearing 294 and the second bearing 296. The bearings 294, 296 may be supported withing the driveline component 120 and the bearings 294, 296 may support the first shaft 284 and allow the first shaft 284 to rotate relative to the driveline component 120. The input gear 286 is positioned on the first shaft 284. In one aspect, the input gear 286 is integrally formed with the first shaft 284 and as such rotates with the first shaft 284. In an alternative aspect, the input gear 286 may be a separate gear that is attached to the first shaft 284. For example, the input gear 286 may have internal splines that mate with external splines on the first shaft 284. The input gear 286 is meshed with the second gear 174 such that the second gear 174 drives the input gear 286 and first shaft 284. As such, the rotational power at the second gear 174 is supplied to the input gear 286 and first shaft 284.

The first shaft 284 extends towards the front of the driveline component 120 and has a splined end inserted into the coupler 292. The second shaft 288 also has a splines end inserted into the coupler 292 and the second shaft extends out of the coupler 292 toward the front of the driveline component 120. The coupler 292 mechanically couples the first shaft 284 and the second shaft 288 together. For example, external splines on the first shaft 284 and external splines on the second shaft 288 may mate with internal splines on the coupler 292. As such, the first shaft drives the second shaft 288 and the rotational power of the first shaft 284 is transferred to the second shaft 288.

The first shaft 284 extends away from the coupler 292 and through the third bearing 298 and the fourth bearing 300. The bearings 298, 300 may be supported withing the driveline component 120 and the bearings 298, 300 may support the second shaft 288 and allow the second shaft 288 to rotate relative to the driveline component 120. The output gear 290 is positioned on the second shaft 288. In one aspect, the output gear 290 is integrally formed with the second shaft 288 and as such rotates with the second shaft 288. In an alternative aspect, the output gear 290 may be a separate gear that is attached to the second shaft 288. For example, the output gear 290 may have internal splines that mate with external splines on the second shaft 288. The output gear 290 is positioned proximate of the side access opening 138 and bottom access opening 140 in the driveline component 120. The output gear 290 rotates around the fourth rotation axis 302. The output gear 290 drives the bottom auxiliary removable middle PTO arrangement 134 (FIGS. 10A-10C) and/or the side auxiliary removable middle PTO arrangement 136 (FIGS. 11A-11C) when either or both are attached.

The PTO assembly 130 further includes a guard 304. The guard 304 may be attached to the driveline component 120. The guard 304 may work as a baffle to reduce oil churning and aeration. The second shaft 288 extends through the guard 304 and the output gear 290 is positioned on a forward side of the guard 304.

As discussed previously, a work vehicle may initially have a PTO assembly and or PTO shifter arrangement that only has two PTO shifter positions. For example, the shifter positions may switch between engaging the rear PTO for 540 or 540E modes. The PTO assembly 130 may be designed such that components of the PTO assembly 130 may be installed into the work vehicle to provide the three PTO shifter positions of the work vehicle 110. For example, the first gear train 154 (e.g., first gear 170, coupler sleeve 172, second gear 174, etc.), rear PTO arrangement 132, countershaft 156, etc. may be installed. The rear cover 142 may be removed from the driveline component 120 to provide access for an operator to these PTO assembly components through the rear access opening. This installation is possible due to the design of the PTO assembly 130 having the distance along the rotation axis 188 between the first gear 170 and the second gear 174 including the first gear 170 and second gear 174 be the same or less than the distance of the two shifter PTO arrangement. As discussed previously, this may be possible due to the coupler sleeve 172 and design of the first gear 170 and second gear 174. This allows the three shifter PTO arrangement components of the first gear train 154 to be installed in this space along the rotation axis 188.

Figure 10A:
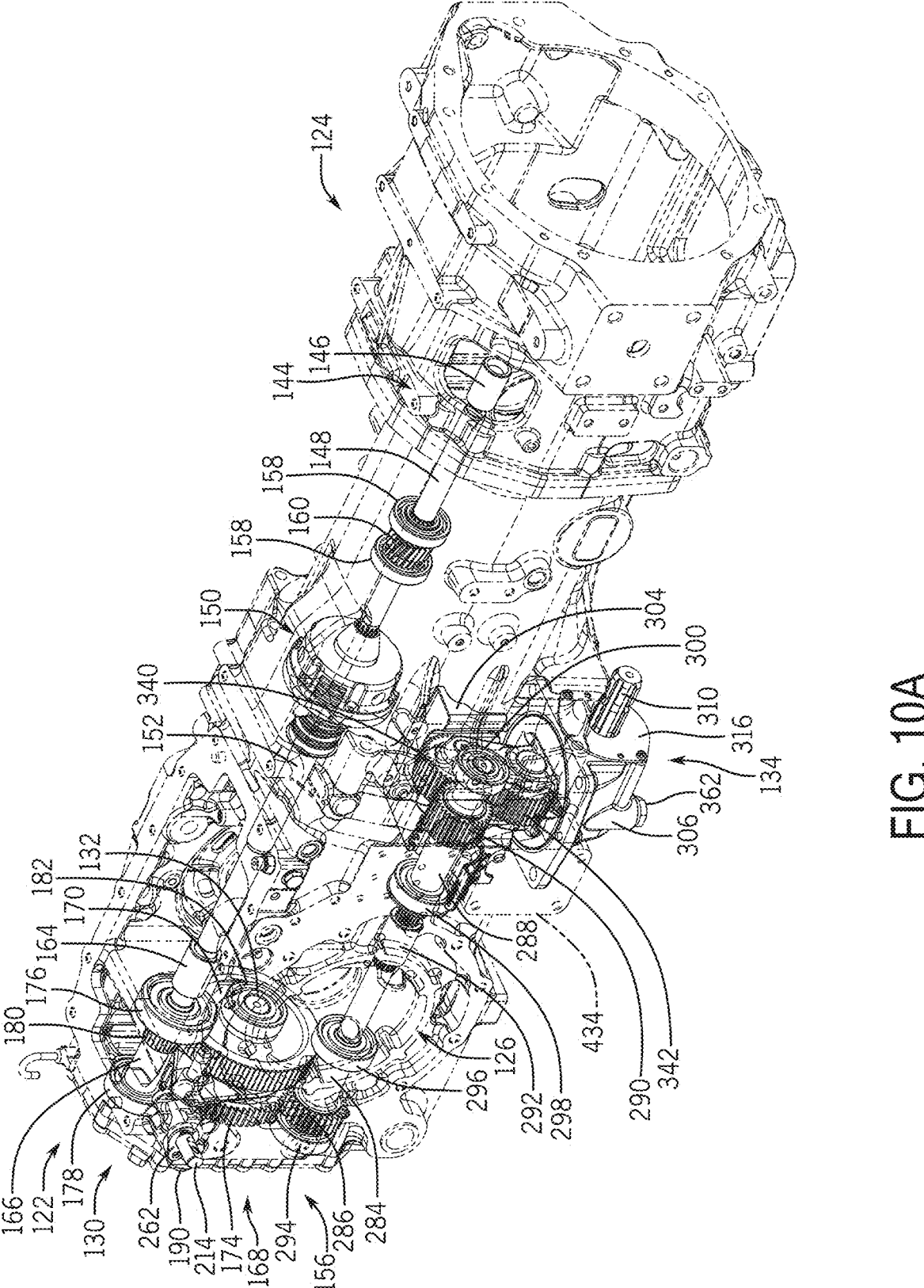
FIG. 10A is a perspective view illustrating a bottom auxiliary removable middle PTO arrangement attached to the driveline component of FIG. 2.
Figure 10B:
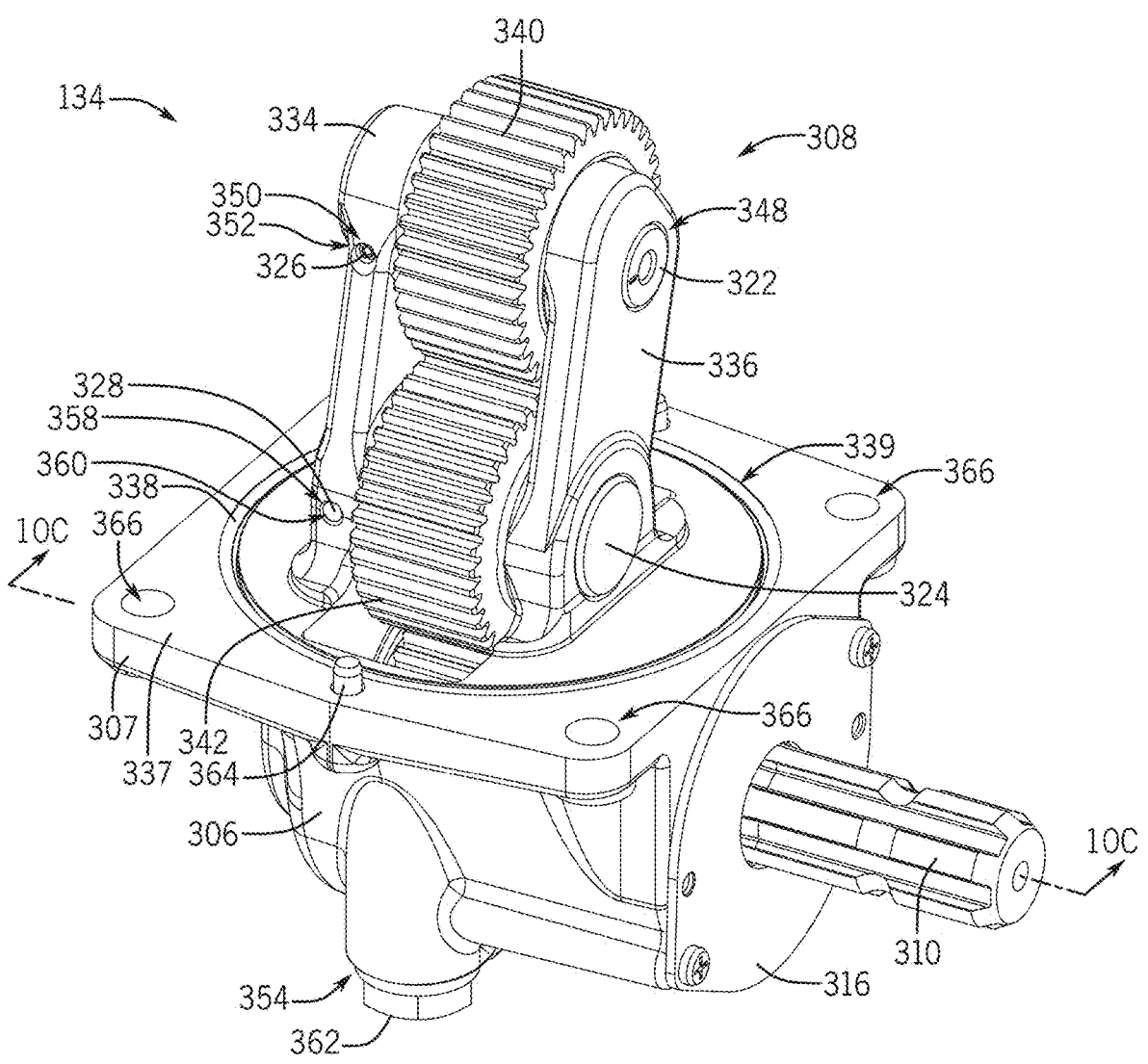
FIG. 10B is a perspective view thereof in isolation.
Figure 10C:
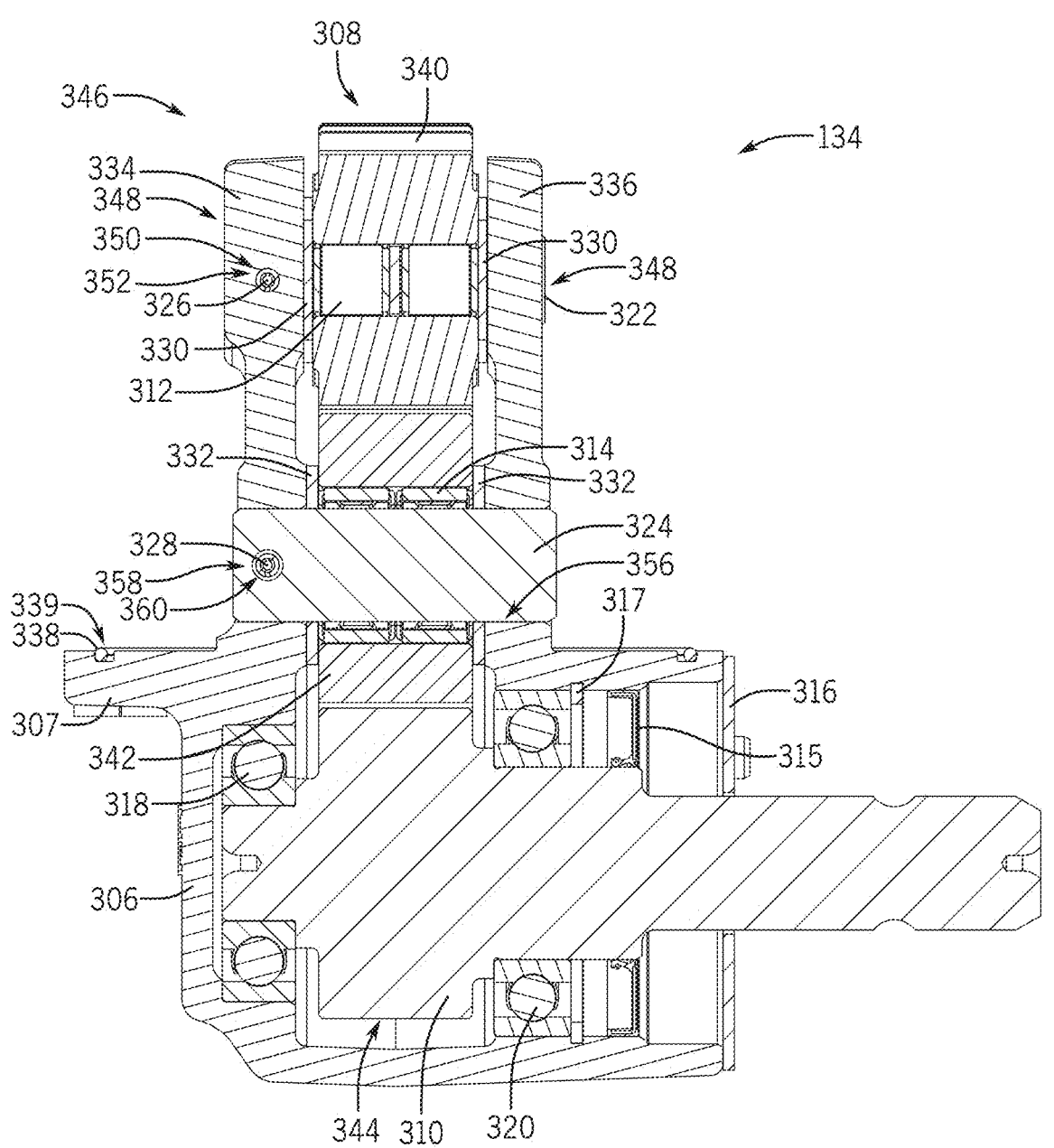
FIG. 10C is a cross-sectional view of thereof taken along line 10C-10C of FIG. 10B.
Figure 11A:
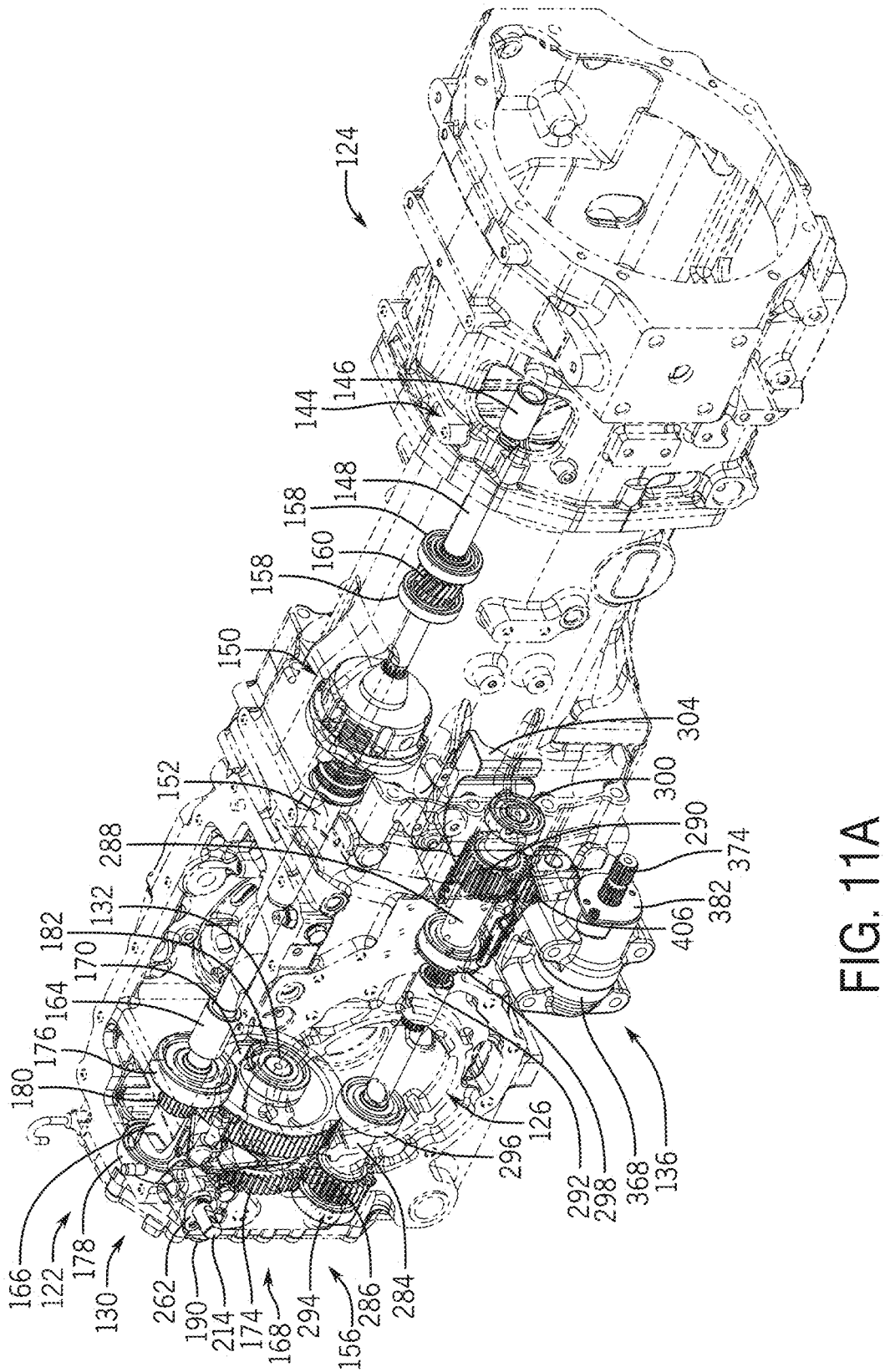
FIG. 11A is a perspective view illustrating a side auxiliary removable middle PTO arrangement attached to the driveline component of FIG. 2.
Figure 11B:
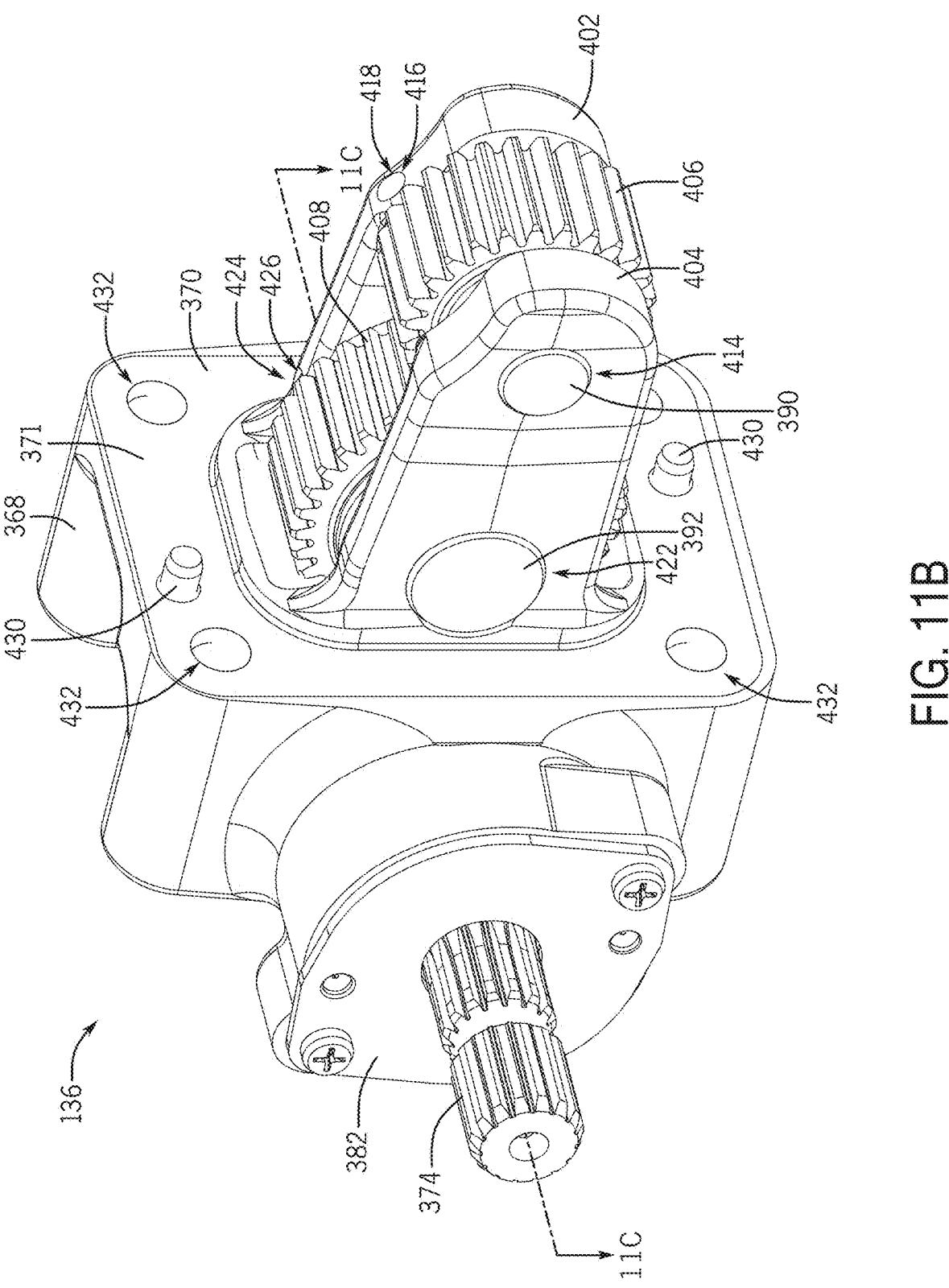
FIG. 11B is a perspective view thereof in isolation.
Figure 11C:
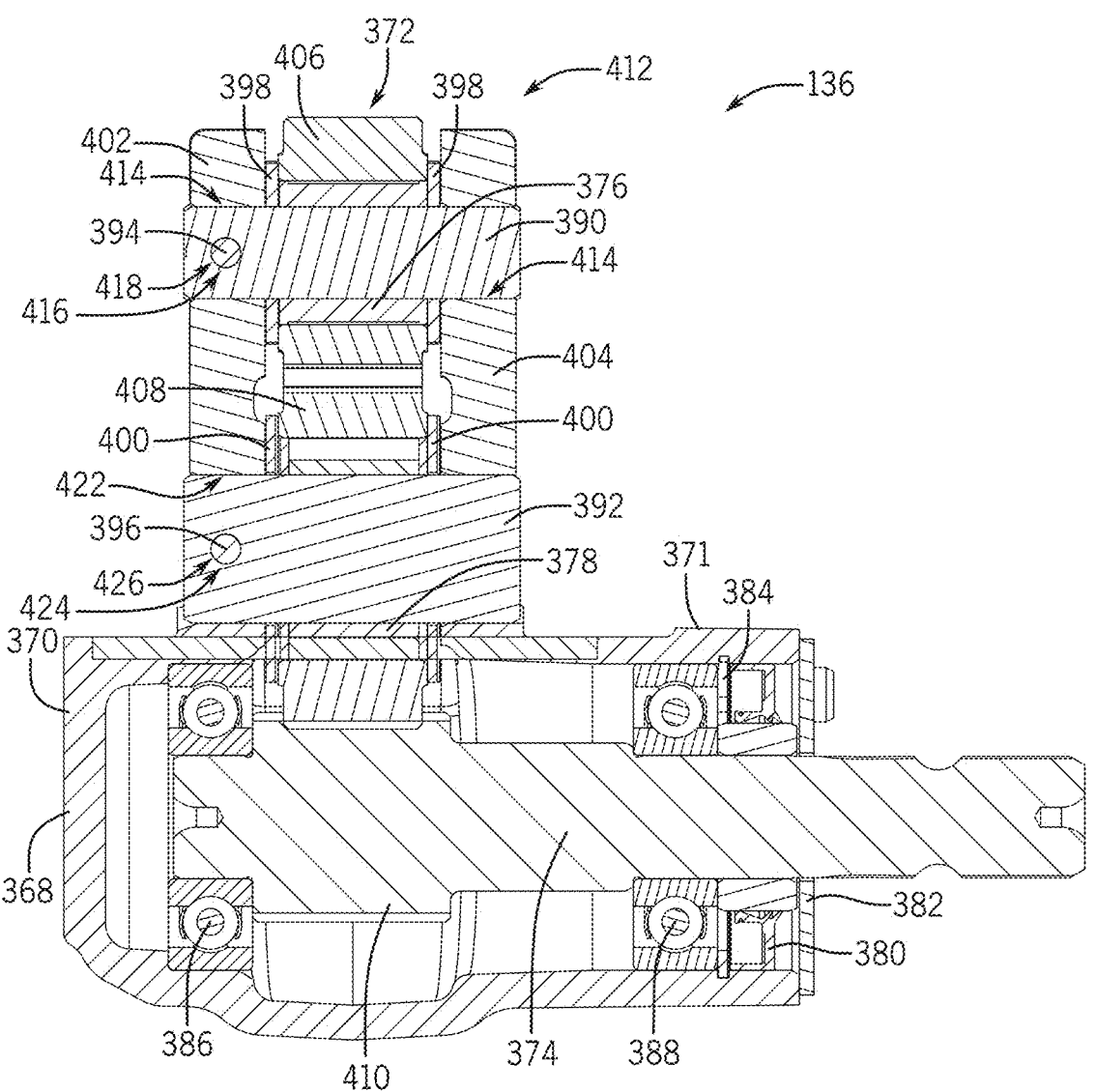
FIG. 11C is a cross-sectional view of thereof taken along line 11C-11C of FIG. 11B.

Referring also to FIGS. 10A-10C, the bottom auxiliary removable middle PTO arrangement 134 is attachable to the bottom of the driveline component 120 and extends through the bottom access opening 140. If no side auxiliary removable middle PTO arrangement 136 is attached, then a side cover 434 is attached to the driveline component 120 to seal the side access opening 138. For example, the side cover 434 may include bolt holes and be bolted to the driveline component 120. The bottom auxiliary removable middle PTO arrangement 134 includes a bottom housing 306, a second gear train 308, a bottom middle PTO output shaft 310, a first bearing 312, a second bearing 314, a seal 315, a cap 316, a third bearing 318, a fourth bearing 320, a first shaft 322, a second shaft 324, a first pin 326, a second pin 328, first washers 330, and second washers 332.

The bottom housing 306 includes a first protrusion 334 extending away from a bottom base 307 of the bottom housing 306 and a second protrusion 336 extending away from the bottom housing 306 parallel to the first protrusion 334. When the bottom auxiliary removable middle PTO arrangement 134 is attached to the driveline component 120, the bottom housing 306 is attached to the driveline component 120. The bottom base 307 includes a top surface 337 defining an annular channel 339. A gasket-ring 338 is positioned within the annular channel 339. When the bottom auxiliary removable middle PTO arrangement 134 is attached to the driveline component 120, the top surface 337 is compressed against the driveline component 120 and the gasket-ring 338 seals the bottom housing 306 against the driveline component 120. The first protrusion 334 and the second protrusion 336 extend away from the top surface 337 and through the bottom access opening 140 toward the output gear 290. The second gear train 308 is supported by the bottom housing 306 and is coupled to the output gear 290. The output gear 290 drives the second gear train 308 which in turn drives the bottom middle PTO output shaft 310.

The second gear train 308 includes an input gear 340, a middle gear 342, and a output gear 344. The input gear 340 is positioned toward a distal end 346 of the first protrusion 334 and the second protrusion 336. The protrusions 334, 336 each define a first hole 348 passing through the protrusions 334, 336 and are in alignment with each other. The first protrusion 334 defines a second hole 350 that is perpendicular to and intersects with the first hole 348 in the first protrusion 334. The first shaft 322 defines a third hole 352 through the first shaft 322. The first shaft 322 is positioned to extend into and between the holes 348. The first shaft 322 is positioned to align the third hole 352 with the second hole 350. The first pin 326 is positioned through the second hole 350 and third hole 352. The first pin 326 maintains the first shaft 322 within the holes 348.

The first bearing 312 is positioned on the first shaft 322 between the first protrusion 334 and the second protrusion 336. The input gear 340 is also positioned on the first shaft 322 between the first protrusion 334 and the second protrusion 336. The first shaft 322 maintains the input gear 340 a fixed distance away from the bottom base 307 of the PTO bottom housing 306. The first bearing 312 is positioned within the input gear 340. The first bearing 312 allows the input gear 340 to rotate relative to the first shaft 322, first protrusion 334, and second protrusion 336. The first washers 330 are positioned on the first shaft 322 on both sides of the input gear 340. For example, a first washer 330 is positioned between the first protrusion 334 and the input gear 340 and a first washer 330 is positioned between the second protrusion 336 and the input gear 340.

The protrusions 334, 336 each define a fourth hole 356 passing through the protrusions 334, 336 and are in alignment with each other. The fourth holes 356 are positioned toward the bottom base 307 of the bottom housing 306. The first protrusion 334 defines a fifth hole 358 that is perpendicular to and intersects with the fourth hole 356 in the first protrusion 334. The second shaft 324 defines a sixth hole 360 through the second shaft 324. The second shaft 324 is positioned to extend into and between the holes 356. The second shaft 324 is positioned to align the sixth hole 360 with the fifth hole 358. The second pin 328 is positioned through the fifth hole 358 and sixth hole 360. The second pin 328 maintains the second shaft 324 within the holes 356. In at least one aspect, the second shaft 324 has a larger diameter than the diameter of the first shaft 322.

The second bearing 314 is positioned on the second shaft 324 between the first protrusion 334 and the second protrusion 336. The middle gear 342 is also positioned on the second shaft 324 between the first protrusion 334 and second protrusion 336. The second shaft 324 maintains the middle gear 342 a fixed distance away from the bottom base 307 of the PTO bottom housing 306. The second bearing 314 is positioned within the middle gear 342. The second bearing 314 allows the middle gear 342 to rotate relative to the second shaft 324, first protrusion 334, and second protrusion 336. The second washers 332 are positioned on the second shaft 324 on both sides of the middle gear 342. For example, a second washer 332 is positioned between the first protrusion 334 and the middle gear 342 and a second washer 332 is positioned between the second protrusion 336 and the middle gear 342. The middle gear 342 is sized and positioned to be meshed with the input gear 340. As such, rotational power from the input gear is transferred to the middle gear 342. The protrusions 334, 336 extend away from the bottom base 307 at an angle. As such, the input gear 340 is laterally offset from the middle gear 342 as shown in FIGS. 101B, 10C, and 12B.

The bottom middle PTO output shaft 310 is positioned within the bottom housing 306 and extends outside of the bottom housing 306. The portion extending out of the bottom housing 306 may be attachable to an implement to drive it. For example, the portion extending out of the bottom housing 306 may be splined so that it may mate with a driving member of an implement. The bottom middle PTO output shaft 310 extends through a third bearing 318, a fourth bearing 320, a seal 315, and then a cap 316 before extending out of the bottom housing 306. The third bearing 318 and the fourth bearing 320 are supported within the bottom housing 306. The third bearing 318 and the fourth bearing 320 allow the bottom middle PTO output shaft 310 to rotate relative to the bottom housing 306. The fourth bearing 320 may be held in position by a snap ring 317. The seal 315 prevents fluid (e.g. hydraulic fluid) from leaking out of the bottom housing 306 at the opening for the bottom middle PTO output shaft 310. The seal 315 is supported by the bottom housing 306 and the seal 315 prevents fluid from leaking between the bottom middle PTO output shaft 310 and the bottom housing 306. The bottom middle PTO output shaft 310 extends through the cap 316 and the cap 316 is attached to an open end of the bottom housing 306. For example, the cap 316 may be bolted to the bottom housing 306. The cap 316 covers the opening and helps prevent dust and/or debris from entering the bottom housing 306.

The output gear 344 is positioned on the bottom middle PTO output shaft 310 between the third bearing 318 and fourth bearing 320. In at least one aspect, the output gear 344 is integrally formed with the bottom middle PTO output shaft 310. For example, the output gear 344 may be a radial protrusion from the bottom middle PTO output shaft 310 with external splines along the outer radial surface. In an alternative, the output gear 344 may be a separate part that is attached to the bottom middle PTO output shaft 310. For example, the output gear 344 may have internal splines that mesh with external splines on the bottom middle PTO output shaft 310. In either aspect, the bottom middle PTO output shaft 310 rotates with the output gear 344.

The bottom auxiliary removable middle PTO arrangement 134 is attachable to the driveline component 120 and extends through the bottom access opening 140. The bottom housing 306 includes alignment pins 364 extending from the bottom base 307 of the bottom housing 306. The alignment pins 364 may be inserted into holes in the driveline component 120 to help align and attach the bottom housing 306 of the bottom auxiliary removable middle PTO arrangement 134 to the driveline component 120. The bottom base 307 of the bottom housing 306 defines bolt holes 366. After the bottom housing 306 is pressed against and aligned with the driveline component 120, then bolts may be inserted through bolt holes 366 and used to attach the bottom housing 306 to the driveline component 120.

When attached, referring to FIG. 12B, the protrusions 334, 336 extend into the driveline component 120 toward the output gear 290. The input gear 340 is meshed and driven by the output gear 290. As such, the output gear 290 drives the second gear train 308, which in turn drives the bottom middle PTO output shaft 310. After the bottom auxiliary removable middle PTO arrangement 134 is attached, an implement may be attached to and driven by the bottom middle PTO output shaft 310 that extends outside of the bottom housing 306. For example, the bottom middle PTO output shaft 310 may be splined outside of the bottom housing 306 such that an implement may be mechanically coupled to the bottom middle PTO output shaft 310. The splines may have 6 straight splines, 15 splines, 20 involute splines, 21 involute splines, 22 involute splines, or etc. Additionally, or alternatively, the bottom middle PTO output shaft 310 may include any other manner to mechanically couple the bottom middle PTO output shaft 310 to drive an implement. The implement attached may vary based on the operation being performed by the work vehicle. Some potential attachable implements powered by a mid-mount PTO are mid-mount mowers, snow blowers, sweepers, etc. Additionally, some front mounted implements may be driven by a mid-mount PTO.

The second gear train 308 at least in part determines the operating speed and torque of the bottom middle PTO output shaft 310. There may be multiple bottom auxiliary removable middle PTO arrangements 134 with the second gear train 308 being different between them. For example, the gear ratios between and the size of the input gear 340, middle gear 342, and output gear 344 may be different for different bottom auxiliary removable middle PTO arrangements 134. These parameters along with others (e.g., layout and quantity of gears in the second gear train 308) may be adjusted to have different bottom auxiliary removable middle PTO arrangements 134 with different operational speeds and torques. For example, there may be one bottom auxiliary removable middle PTO arrangement 134 with an operational speed of 1000 RPMs and another bottom auxiliary removable middle PTO arrangements 134 with an operational speed of 2000 RPMS. The bottom auxiliary removable middle PTO arrangement 134 chosen to be used may be selected based on the speed and torque needed for the implement that is attached to the bottom auxiliary removable middle PTO arrangement 134.

Similarly, the direction of rotation of the bottom middle PTO output shaft 310 may be determined based on the layout of the second gear train 308. For example, adjusting the layout and/or the number of gears in the second gear train 308 may change the direction of the bottom middle PTO output shaft 310.

The bottom housing 306 includes a drain hole 354 and a drain plug 362. The drain plug 362 is threaded into the drain hole 354 to prevent any fluid (e.g. hydraulic fluid) from leaking out of the drain hole 354. When a bottom auxiliary removable middle PTO arrangement 134 is attached, the drain plug 362 is removed to allow fluid such as hydraulic fluid inside of the driveline component 120 and housings 306, 368 to drain out to allow for the addition or removal of an auxiliary removable middle PTO arrangement 134, 136. The hydraulic fluid inside of the driveline component 120 and housings 306, 368 lubricates the different gear trains and systems housed inside of the driveline component 120 and housings 306, 368. The hydraulic fluid may also be used for cooling the different systems.

Referring also to FIGS. 11A-11C, the side auxiliary removable middle PTO arrangement 136 is attachable to the driveline component 120 and is similar in design to the side auxiliary removable middle PTO arrangement 136. The side auxiliary removable middle PTO arrangement 136 is attachable to the side of the driveline component 120 and extends through the side access opening 138. If no bottom auxiliary removable middle PTO arrangement 134 is attached, then a bottom cover is attached to the driveline component 120 to seal the bottom access opening 140. For example, the bottom cover may include bolt holes and be bolted to the driveline component 120. The side auxiliary removable middle PTO arrangement 136 includes a side housing 368, a third gear train 372, a side middle PTO output shaft 374, a first bearing 376, a second bearing 378, a seal 380, a cap 382, a third bearing 386, a fourth bearing 388, a first shaft 390, a second shaft 392, a first pin 394, a second pin 396, first washers 398, and second washers 400.

The side housing 368 includes a first protrusion 402 extending away from a side base 370 of the side housing 368 and a second protrusion 404 extending away from the side housing 368 parallel to the first protrusion 402. The side base 370 includes a surface 371. When the side auxiliary removable middle PTO arrangement 136 is attached to the driveline component 120, the side housing 368 is attached to the driveline component 120. The surface 371 of the side base 370 is compressed against the driveline component 120. When the side housing 368 is attached, the first protrusion 402 and the second protrusion 404 extend away from the surface 371 and through the side access opening 138 toward the output gear 290. The third gear train 372 is supported by the side housing 368 and is coupled to the output gear 290. The output gear 290 drives the third gear train 372 which in turn drives the side middle PTO output shaft 374.

The third gear train 372 includes an input gear 406, a middle gear 408, and a output gear 410. The input gear 406 is positioned toward a distal end 412 of the first protrusion 402 and the second protrusion 404. The protrusions 402, 404 each define a first hole 414 passing through the protrusions 402, 404 and are in alignment with each other. The first protrusion 402 defines a second hole 416 that is perpendicular to and intersects with the first hole 414 in the first protrusion 402. The first shaft 390 defines a third hole 418 through the first shaft 390. The first shaft 390 is positioned to extend into and between the holes 414. The first shaft 390 is positioned to align the third hole 418 with the second hole 416. A first pin 394 is positioned through the second hole 416 and third hole 418. The first pin 394 maintains the first shaft 390 within the holes 414.

The first bearing 376 is positioned on the first shaft 390 between the first protrusion 402 and the second protrusion 404. The input gear 406 is also positioned on the first shaft 390 between the first protrusion 402 and the second protrusion 404. The first shaft 390 maintains the input gear 406 a fixed distance away from the side base 370 of the PTO side housing 368. The first bearing 376 is positioned within the input gear 406. The first bearing 376 allows the input gear 406 to rotate relative to the first shaft 390, first protrusion 402, and second protrusion 404. The first washers 398 are positioned on the first shaft 390 on both sides of the input gear 406. For example, a first washer 398 is positioned between the first protrusion 402 and the input gear 406 and a first washer 398 is positioned between the second protrusion 404 and the input gear 406.

The protrusions 402, 404 each define a fourth hole 422 passing through the protrusions 402, 404 and are in alignment with each other. The fourth holes 422 are positioned toward the side base 370 of the side housing 368. The first protrusion 402 defines a fifth hole 424 that is perpendicular to and intersects with the fourth hole 422 in the first protrusion 402. The second shaft 392 defines a sixth hole 426 through the second shaft 392. The second shaft 392 is positioned to extend into and between the holes 422. The second shaft 392 is positioned to align the sixth hole 426 with the fifth hole 424. A second pin 396 is positioned through the fifth hole 424 and sixth hole 426. The second pin 396 maintains the second shaft 392 within the holes 422. In at least one aspect, the second shaft 392 has a larger diameter than the diameter of the first shaft 390.

The second bearing 378 is positioned on the second shaft 392 between the first protrusion 402 and the second protrusion 404. The middle gear 408 is also positioned on the second shaft 392 between the first protrusion 402 and the second protrusion 404. The second shaft 392 maintains the middle gear 408 a fixed distance away from the side base 370 of the PTO side housing 368. The second bearing 378 is positioned within the middle gear 408. The second bearing 378 allows the middle gear 408 to rotate relative to the second shaft 392, first protrusion 402, and second protrusion 404. The second washers 400 are positioned on the second shaft 392 on both sides of the middle gear 408. For example, a second washer 400 is positioned between the first protrusion 402 and the middle gear 408 and a second washer 400 is positioned between the second protrusion 404 and the middle gear 408. The middle gear 408 is sized and positioned to be meshed with the input gear 406. As such, rotational power from the input gear 406 is transferred to the middle gear 408.

The side middle PTO output shaft 374 is positioned within the side housing 368 and extends outside of the side housing 368. The portion extending out of the side housing 368 may be attachable to an implement to drive it. For example, the portion extending out of the side housing 368 may be splined so that it may mate with a driving member of an implement. The side middle PTO output shaft 374 extends through a third bearing 386, a fourth bearing 388, a seal 380, and then a cap 382 before extending out of the side housing 368. The third bearing 386 and the fourth bearing 388 are supported within the side housing 368. The third bearing 386 and the fourth bearing 388 allow the side middle PTO output shaft 374 to rotate relative to the side housing 368. The fourth bearing 388 may be held in position by a snap ring 384 and the shape of the side middle PTO output shaft 374. The seal 380 prevents fluid (e.g. hydraulic fluid) from leaking out of the side housing 368 at the opening for the side middle PTO output shaft 374. The seal 380 is supported by the side housing 368 and the seal 380 prevents fluid from leaking between the side middle PTO output shaft 374 and the side housing 368. The side middle PTO output shaft 374 extends through the cap 382 and the cap 382 is attached to an open end of the side housing 368. For example, the cap 382 may be bolted to the side housing 368. The cap 382 covers the opening and helps prevent dust and/or debris from entering the side housing 368.

The output gear 410 is positioned on the side middle PTO output shaft 374 between the third bearing 386 and fourth bearing 388. In at least one aspect, the output gear 410 is integrally formed with the side middle PTO output shaft

374. For example, the output gear 410 may be a radial protrusion from the side middle PTO output shaft 374 with external splines along the outer radial surface. In an alternative, the output gear 410 may be a separate part that is attached to the side middle PTO output shaft 374. For example, the output gear 410 may have internal splines that mesh with external splines on the side middle PTO output shaft 374. In either aspect, the side middle PTO output shaft 374 rotates with the output gear 410.

The side auxiliary removable middle PTO arrangement 136 is attachable to the driveline component 120 and extends through the side access opening 138. The side housing 368 includes alignment pins 430 extending from the side base 370 of the side housing 368. The alignment pins 430 may be inserted into holes in the driveline component 120 to help align and attach the side housing 368 of the side auxiliary removable middle PTO arrangement 136 to the driveline component 120. The side base 370 of the side housing 368 defines bolt holes 432. After the side housing 368 is pressed against and aligned with the driveline component 120, then bolts may be inserted through bolt holes 432 and used to attach the side housing 368 to the driveline component 120.

When attached, referring to FIG. 12B, the protrusions 402, 404 extend into the driveline component 120 toward the output gear 290. The input gear 406 is meshed and driven by the output gear 290. As such, the output gear 290 drives the third gear train 372, which in turn drives the side middle PTO output shaft 374. After the side auxiliary removable middle PTO arrangement 136 is attached, an implement may be attached to and driven by the side middle PTO output shaft 374 that extends outside of the side housing 368. For example, the side middle PTO output shaft 374 may be splined outside of the side housing 368 such that an implement may be mechanically coupled to the side middle PTO output shaft 374. The splines may have 6 straight splines, 15 splines, 20 involute splines, 21 involute splines, or 22 involute splines. Additionally or alternatively, the side middle PTO output shaft 374 may include any other manner to mechanically couple the side middle PTO output shaft 374 to drive an implement. The implement attached may vary based on the operation being performed by the work vehicle. Some potential attachable implements powered by a mid-mount PTO are mid-mount mowers, snow blowers, sweepers, etc. Additionally, some front mounted implements may be driven by a mid-mount PTO.

The third gear train 372 at least in part determines the operating speed and torque of the side middle PTO output shaft 374. There may be multiple side auxiliary removable middle PTO arrangements 136 with the third gear train 372 being different between them. For example, the gear ratios between and size of the input gear 406, middle gear 408, and output gear 410 may be different for different side auxiliary removable middle PTO arrangements 136. These parameters may be adjusted along with others (e.g., layout and quantity of gears in the third gear train 372) to have different side auxiliary removable middle PTO arrangements 136 with different operational speeds and torques. For example, there may be one side auxiliary removable middle PTO arrangement 136 with an operational speed of 1000 RPMs and another side auxiliary removable middle PTO arrangements 136 with an operational speed of 2000 RPMS. The side auxiliary removable middle PTO arrangement 136 chosen to be used may be selected based on the speed and torque needed for the implement that is attached to the side auxiliary removable middle PTO arrangement 136.

Similarly, the direction of rotation of the side middle PTO output shaft 374 may be determined based on the layout of the third gear train 372. For example, adjusting the layout and/or the number of gears in the third gear train 372 may change the direction of the side middle PTO output shaft 374.

The driveline component 120 includes a drain hole 420 and a drain plug 428. The drain plug 428 is threaded into the drain hole 420 to prevent any fluid (e.g. hydraulic fluid) from leaking out of the drain hole 420. When a bottom auxiliary removable middle PTO arrangement not attached, the drain plug 428 is removed to allow fluid such as hydraulic fluid inside of the driveline component 120 and side housing 368 to drain out to allow for the addition or removal of an auxiliary removable middle PTO arrangement 134, 136. The hydraulic fluid inside of the driveline component 120 and housings 306, 368 lubricates the different gear trains and systems housed inside of the driveline component 120 and housings 306, 368. The hydraulic fluid may also be used for cooling the different systems.

The work vehicle 110 may be configured in a plurality of ways to accommodate the operation of the work vehicle. For example, different auxiliary removable middle PTO arrangement 134, 136 may be attached to the work vehicle to run a specific attachable implement. The different combinations of auxiliary removable middle PTO arrangement 134, 136 allows the work vehicle to be configured differently for different operators and for different operations. For example, the work vehicle 110 may have no auxiliary removable middle PTO arrangement 134, 136, only a side auxiliary removable middle PTO arrangement 136 attached, only a bottom auxiliary removable middle PTO arrangement 134 attached, or both a bottom auxiliary removable middle PTO arrangement 134 and a side auxiliary removable middle PTO arrangement 136 attached. There may be different bottom auxiliary removable middle PTO arrangements 134 that may provide different rotational directions, speeds, and/or torques. Similarly, there may be different side auxiliary removable middle PTO arrangements 136 that may provide different rotational directions, speeds, and/or torques. As such, there are a variety of configurations for the work vehicle 110 that may be formed by attaching different auxiliary removable middle PTO arrangements 134, 136 to address an operator's needs.

Figure 12A:
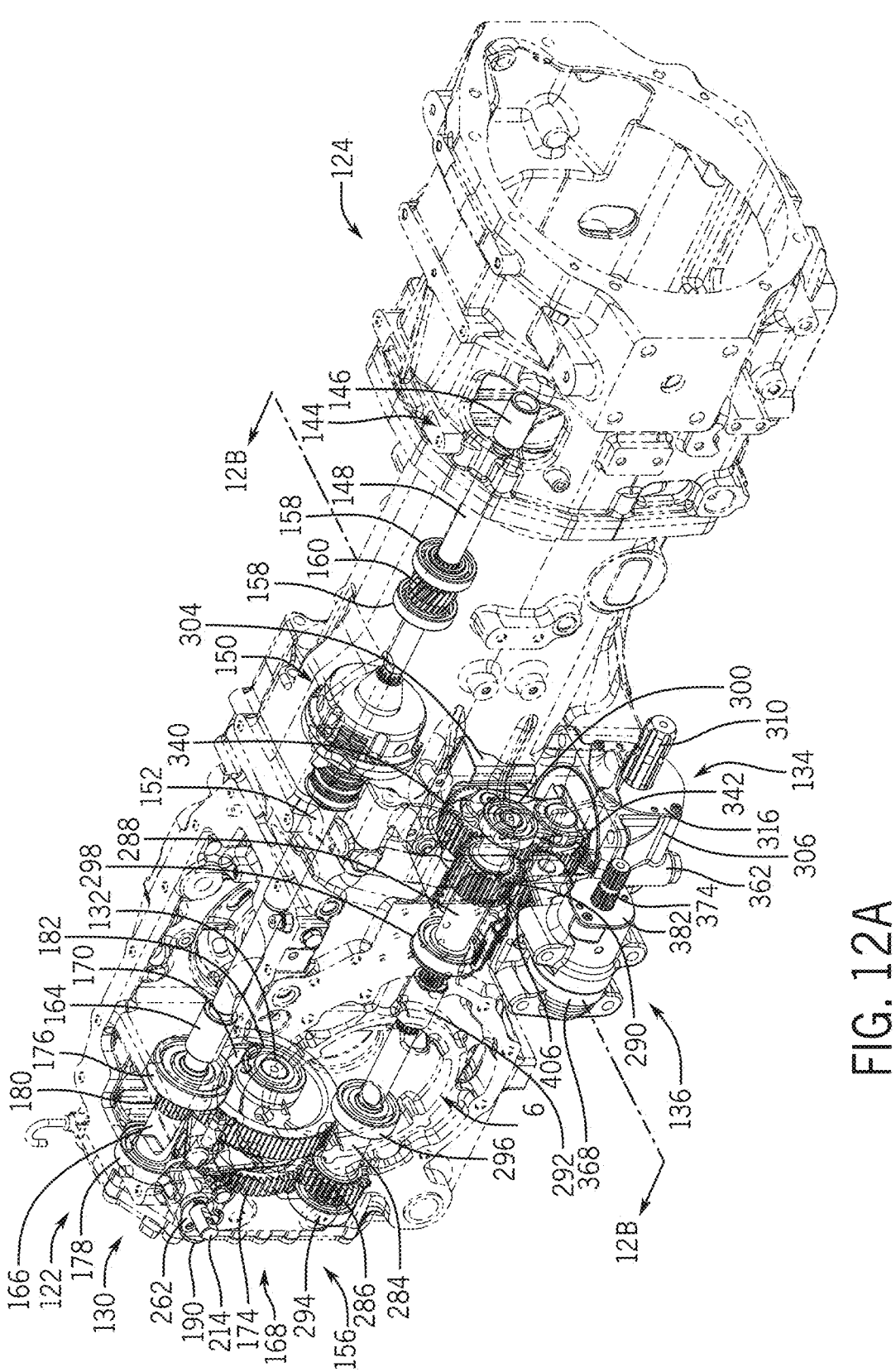
FIG. 12A is a perspective view illustrating the side auxiliary removable middle PTO arrangement and the bottom auxiliary removable middle PTO arrangement attached to the driveline component of FIG. 2.
Figure 12B:
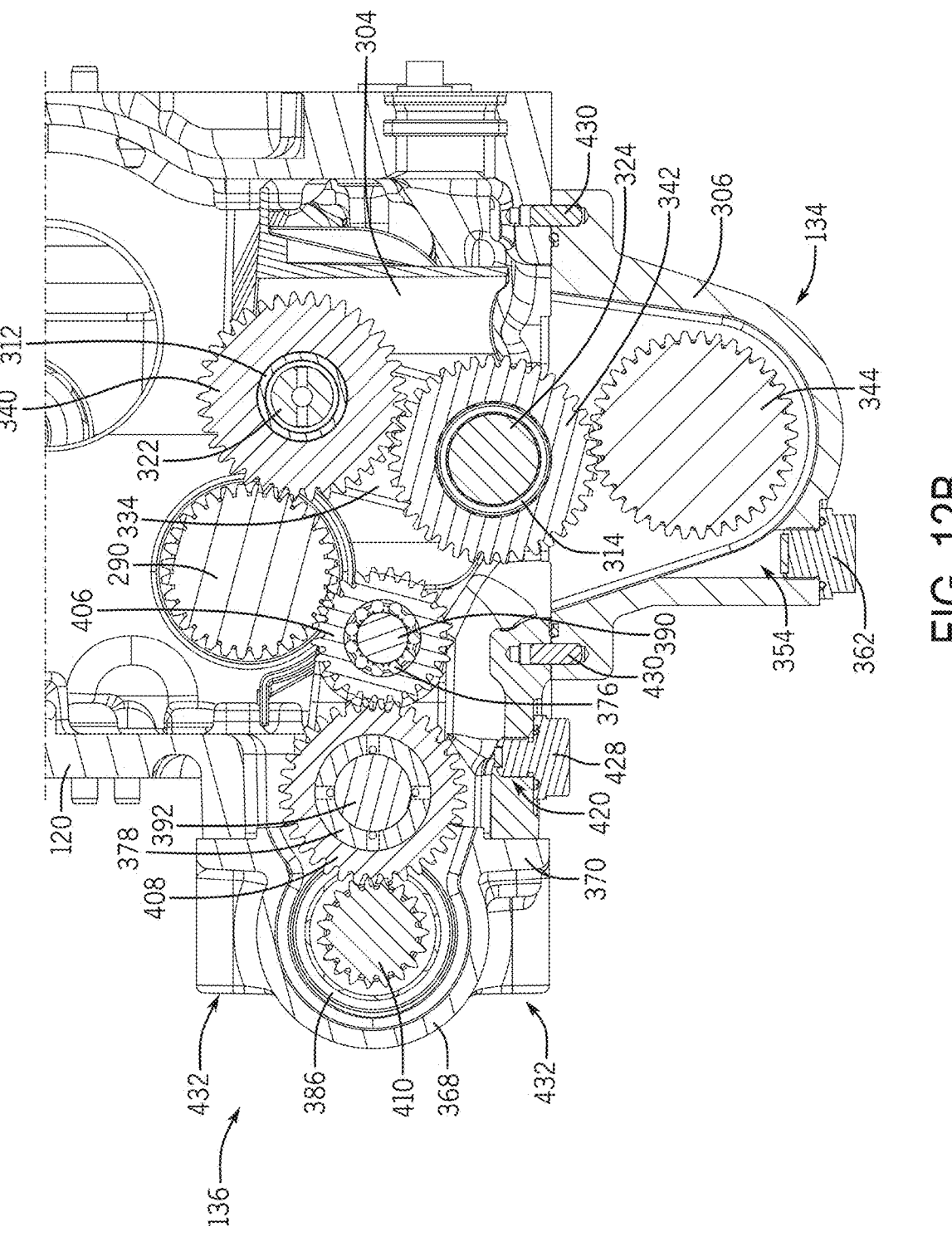
FIG. 12B is a cross-sectional view thereof taken along line 12B-12B of FIG. 12A.

Referring to FIGS. 12A and 12B, the driveline component 120 may have both a side auxiliary removable middle PTO arrangement 136 and a bottom auxiliary removable middle PTO arrangement 134 attached. As shown in FIG. 12B, the side housing 368 extends into the side access opening 138 and the input gear 406 is engaged with the output gear 290. Similarly, the bottom housing 306 extends into the bottom access opening 140 and the input gear 340 is engaged with the output gear 290. The protrusions 334, 336 extend into the bottom access opening 140 at an angle. In at least one aspect, this angle allows both the input gears 406, 340 of the auxiliary removable middle PTO arrangements 136, 134 to mesh with the output gear 290 at the same time. For example, the angle allows the input gear 340 to be positioned laterally to the side, which provides more room for the input gear 406 to also mesh with the output gear 290.

Additionally, the work vehicle 110 may initially not include any auxiliary removable middle PTO arrangement 134, 136. In this instance, there may not be a countershaft 156 installed in this work vehicle 110. The rear cover 142 may be removed to provide easy access for installing or working on the countershaft 156 without needing to disassembly the driveline component 120. This allows an operator to install a countershaft 156 if they desire to attach an auxiliary removable middle PTO arrangement 134, 136 to operate a specific implement.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure. Although portions of the disclosure may use the phrase "at least one" or "one or more" of a particular component or element, unless otherwise specifically limited, the mere recitation of a single element or component does not preclude a plurality of such elements or components.

What is claimed is:

1. A power take-off (PTO) assembly for a transmission of a work vehicle, the PTO assembly comprising:
   a first gear and a second gear spaced apart about a rotation axis, the first gear having a first annular hub with external splines extending about the rotation axis and the second gear having a second annular hub with external splines extending about the rotation axis;
   a first PTO arrangement having an output gear driving an output shaft to rotate about the rotation axis;
   a second PTO arrangement having a countershaft gear driven by the second gear to rotate a countershaft arranged in parallel with the output shaft;
   a coupler sleeve having internal splines and external splines and disposed about the rotation axis between the first gear and the second gear, the internal splines of the coupler sleeve being in engagement with the external splines of the first annular hub of the first gear; and
   a PTO shifter arrangement having a shifting ring disposed about the rotation axis with internal input splines in sliding engagement with the external splines of the coupler sleeve and with internal output splines spaced apart from the internal input splines along the rotation axis by a gap, the shifting ring being translatable along the rotation axis between a first position, a second position, and a third position such that the internal output splines are engaged with and transfer rotational power to: the output gear only when the shifting ring is in the first position, the output gear and the second gear when the shifting ring is in the second position, and the second gear only when the shifting ring is in the third position.

2. The PTO assembly of claim 1, wherein the first annular hub extends a distance axially along the rotation axis from the first gear to proximate the output gear and the second annular hub is proximate the output gear opposite the first annular hub.

3. The PTO assembly of claim 2, wherein the coupler sleeve extends the distance axially along the rotation axis and is positioned coaxially with the first annular hub along the rotation axis, and wherein the external splines of the coupler sleeve extend the distance axially along the rotation axis.

4. The PTO assembly of claim 1, wherein the internal input splines of the shifting ring engage the external splines of the coupler sleeve at a different axial position along the rotation axis for each position of the shifting ring.

5. The PTO assembly of claim 1, wherein in the third position the shifting ring is positioned axially along the rotation axis to position the output gear in the gap disengaging the internal output splines from the output gear.

6. The PTO assembly of claim 1, wherein the internal input splines comprise first splines and second splines spaced apart axially along the rotation axis from the first splines by a second gap.

7. The PTO assembly of claim 6, wherein each external spline of the coupler sleeve includes a locking feature positioned on and extending away from both flanks, wherein in the first position, the locking feature is positioned within the gap, in the second position the locking feature is positioned within the second gap, and in the third position, the locking feature is positioned outside of the shifting ring.

8. The PTO assembly of claim 7, wherein the locking features are configured to allow the first splines and second splines to slide axially past the locking features when the shifting ring is not rotating about the rotation axis, and wherein the locking features are configured to prevent the first splines and second splines from sliding axially past the locking features when the shifting ring is rotating about the rotation axis.

9. The PTO assembly of claim 1, wherein the first gear, the second gear, and the shifting ring are each positioned coaxially with the first PTO arrangement.

10. The PTO assembly of claim 1, wherein a housing of the transmission defines a rear access opening to provide access to the first PTO arrangement, the second PTO arrangement, the first gear, the second gear, the coupler sleeve, and the PTO shifter arrangement.

11. A transmission of a work vehicle, the transmission comprising:
   a housing defining a rear access opening and a rear cover positioned over the rear access opening; and
   a PTO assembly positioned within the housing, the PTO assembly comprising:
      a first gear and a second gear spaced apart about a rotation axis, the first gear having a first annular hub with external splines extending about the rotation axis and the second gear having a second annular hub with external splines extending about the rotation axis;
      a rear PTO arrangement having an output gear driving an output shaft to rotate about the rotation axis, wherein the output shaft extends through the rear cover;
      a middle PTO arrangement having a countershaft gear driven by the second gear to rotate a countershaft arranged in parallel with the output shaft, the countershaft extending along the housing away from the rear PTO arrangement;
      a coupler sleeve having internal splines and external splines and disposed about the rotation axis between the first gear and the second gear, the internal splines of the coupler sleeve being in engagement with the external splines of the first annular hub of the first gear; and
   a PTO shifter arrangement having a shifting ring disposed about the rotation axis with internal input splines in sliding engagement with the external splines of the coupler sleeve and with internal output splines spaced apart from the internal input splines along the rotation axis by a gap, the shifting ring being translatable along the rotation axis between a first position, a second position, and a third position such that the internal output splines are engaged with and transfer rotational power to: the output gear only when the shifting ring is in the first position, the output gear and the second gear when the shifting ring is in the second position, and the second gear only when the shifting ring is in the third position.

12. The transmission of claim 11, wherein the first annular hub extends a distance axially along the rotation axis from the first gear to proximate the output gear and the second annular hub is proximate the output gear opposite the first annular hub.

13. The transmission of claim 12, wherein the coupler sleeve extends the distance axially along the rotation axis and is positioned coaxially with the first annular hub along the rotation axis, and wherein the external splines of the coupler sleeve extend the distance axially along the rotation axis.

14. The transmission of claim 11, wherein the internal input splines of the shifting ring engage the external splines of the coupler sleeve at a different axial position along the rotation axis for each position of the shifting ring.

15. The transmission of claim 11, wherein in the third position the shifting ring is positioned axially along the rotation axis to position the output gear in the gap disengaging the internal output splines from the output gear.

16. The transmission of claim 11, wherein the internal input splines comprise first splines and second splines spaced apart axially along the rotation axis from the first splines by a second gap.

17. The transmission of claim 16, wherein each external spline of the coupler sleeve includes a locking feature positioned on and extending away from both flanks, wherein in the first position, the locking feature is positioned within the gap, in the second position the locking feature is positioned within the second gap, and in the third position, the locking feature is positioned outside of the shifting ring.

18. The transmission of claim 17, wherein the locking features are configured to allow the first splines and second splines to slide axially past the locking features when the shifting ring is not rotating about the rotation axis, and wherein the locking features are configured to prevent the first splines and second splines from sliding axially past the locking features when the shifting ring is rotating about the rotation axis.

19. The transmission of claim 11, wherein the first gear, the second gear, and the shifting ring are each positioned coaxially with the rear PTO arrangement.

20. The transmission of claim 11, wherein the rear access opening is configured to provide access to the rear PTO arrangement, the middle PTO arrangement, the first gear, the second gear, the coupler sleeve, and the PTO shifter arrangement.

* * * * *